(12) United States Patent
Ophardt

(10) Patent No.: US 8,365,965 B2
(45) Date of Patent: Feb. 5, 2013

(54) WITHDRAWAL DISCHARGING PISTON PUMP

(75) Inventor: Heiner Ophardt, Vineland (CA)

(73) Assignee: Gotohti.com, Inc., Ontario (CA)

( * ) Notice: Subject to any disclaimer, the term of this patent is extended or adjusted under 35 U.S.C. 154(b) by 894 days.

(21) Appl. No.: 12/457,476

(22) Filed: Jun. 11, 2009

(65) Prior Publication Data

US 2009/0308894 A1 Dec. 17, 2009

(30) Foreign Application Priority Data

Jun. 12, 2008 (CA) .................................. 2634981

(51) Int. Cl.
*G01F 11/02* (2006.01)
(52) U.S. Cl. ............... 222/321.8; 222/181.1; 222/181.3; 222/190; 417/521
(58) Field of Classification Search ............... 222/190, 222/321.7–321.9, 571, 180, 181.1–181.3, 222/440, 448, 501, 453, 207, 209, 211, 212, 222/145.5–145.6, 189.06, 189.1, 189.11, 222/378, 340, 185.1; 417/521
See application file for complete search history.

(56) References Cited

U.S. PATENT DOCUMENTS

| | | | | |
|---|---|---|---|---|
| 5,445,288 | A | * | 8/1995 | Banks ............................. 222/95 |
| 5,489,044 | A | | 2/1996 | Ophardt |
| 5,676,277 | A | | 10/1997 | Ophardt |
| 5,975,360 | A | * | 11/1999 | Ophardt ........................ 222/83 |
| 6,446,840 | B2 | | 9/2002 | Ophardt |
| 6,601,736 | B2 | * | 8/2003 | Ophardt et al. ............ 222/181.1 |
| 7,198,175 | B2 | | 4/2007 | Ophardt |
| 7,267,251 | B2 | | 9/2007 | Ophardt |
| 7,270,250 | B2 | | 9/2007 | Jones |
| 7,303,099 | B2 | | 12/2007 | Ophardt |
| RE40,319 | E | | 5/2008 | Ophardt |
| 8,157,134 | B2 | * | 4/2012 | Ophardt et al. ............ 222/321.7 |
| 2006/0175354 | A1 | | 8/2006 | Ophardt |
| 2006/0237483 | A1 | | 10/2006 | Ophardt |
| 2006/0249538 | A1 | | 11/2006 | Ophardt |
| 2007/0257064 | A1 | | 11/2007 | Ophardt |

* cited by examiner

*Primary Examiner* — Kevin P Shaver
*Assistant Examiner* — Robert Nichols, II
(74) *Attorney, Agent, or Firm* — Thorpe North & Western LLP

(57) ABSTRACT

A pump assembly with a first pump which draws liquid from a reservoir and dispenses it to a second pump. The second pump receives the discharge from the first pump and air such that the second pump discharges both liquid and air. The first pump preferably has a piston movable in a first inner chamber and the second pump utilizes the same piston movable in a second outer chamber. Preferably, the second pump discharges in the withdrawal stroke, that is while moving from a retracted position to a withdrawn position.

20 Claims, 15 Drawing Sheets

WITHDRAWAL DISCHARGING PISTON PUMP

SCOPE OF THE INVENTION

This invention relates to liquid dispensers and, more particularly, liquid dispensers to dispensing liquid and air, preferably as a foam or mist spray.

BACKGROUND OF THE INVENTION

Liquid dispensers for dispensing soaps and other similar fluids in liquid form are known. For various reasons in some applications, it is preferable to dispense liquids, soaps and air. As one example, it may be desired to dispense other similar fluids in the form of a foam. Generally, in the form of a foam, less soap liquid is required to be used as contrasted with the soap in the liquid form. As well, soap as foam is less likely to run off a user's hands or other surfaces to be cleaned. As another example, it may be desired to dispense liquid mixed with air as a mist.

SUMMARY OF THE INVENTION

The present invention provides improved and simplified apparatuses for dispensing a fluid and air preferably as a foam or as a mist spray.

The present invention also provides a pump assembly with a first pump which draws liquid from a reservoir and dispenses it to a second pump. The second pump receives the discharge from the first pump and air such that the second pump discharges both liquid and air. The first pump preferably has a piston movable in a first inner chamber and the second pump utilizes the same piston movable in a second outer chamber. Preferably, the second pump discharges in the withdrawal stroke, that is while moving from a retracted position to a withdrawn position.

In one version, the first pump and the second pump are out of phase in the sense that in one stroke the first pump discharges while the second pump draws in and, in the opposite stroke, the first pump draws in while the second pump discharges. In a second version, the first pump and the second pump are in phase in the sense that both discharge in the same stroke and both draw in in the opposite stroke.

Preferably, a one-way valve is provided between the first chamber and the reservoir to provide flow outwardly only from the reservoir to the first chamber. Preferably, communication is provided between the first chamber and the second chamber, preferably with a one-way valve providing flow outwardly only from the first chamber to the second chamber.

Preferably, simultaneously discharged air and liquid may preferably produce foam by passing through a foam generator, such as a porous member, or be atomized as by passing through a nozzle.

An object of the present invention is to provide an improved pump for dispensing a liquid and air.

Another object is to provide an improved pump for dispensing a liquid in the form of a foam or air mist or air spray.

Another object is to provide an improved pump for discharge in the withdrawal stroke of liquid and air.

In one aspect, the present invention provides a pump for dispensing liquid from a reservoir comprising:

a piston-chamber forming member having an inner cylindrical chamber, an intermediate cylindrical chamber and an outer cylindrical chamber, the inner chamber, intermediate chamber and outer chamber each having a diameter, a chamber wall, an inner end and an outer end, the diameter of the inner chamber being less than the diameter of the intermediate chamber, the diameter of the outer chamber being less than the diameter of the intermediate chamber, the inner chamber, intermediate chamber and outer chamber being coaxial with the outer end of the inner chamber opening into the inner end of the intermediate chamber, and the outer end of the intermediate chamber opening into the inner end of the outer chamber, the inner end of the inner chamber in fluid communication with the reservoir, a piston-forming element received in the piston chamber-forming member axially slidable inwardly and outwardly therein between an inward retracted position and an outward extended position, said piston-forming element having a central axially extending hollow stem having a central passageway closed at an inner end and having an outlet proximate an outer end, an inner disc extending radially outwardly from the stem, the inner disc adapted to engage the chamber wall of the inner chamber, an intermediate disc extending radially outwardly from the stem spaced axially outwardly from the inner disc, the intermediate disc adapted to engage the chamber wall of the intermediate chamber, an outer disc extending radially outwardly from the stem spaced axially outwardly from the intermediate disc, the outer disc engaging the chamber wall of the outer chamber, an inlet located on the stem between the intermediate disc and the outer disc in communication with the passageway, the piston-forming element slidably received in the piston chamber-forming member for reciprocal axial inward and outward movement therein with the inner disc in the inner chamber, the intermediate disc in the intermediate chamber and the outer disc in the outer chamber, the inner disc substantially preventing fluid flow in the inner chamber past the inner disc in an inward direction, the intermediate disc substantially preventing fluid flow in the intermediate chamber past the intermediate disc in an inward direction, the outer disc substantially preventing fluid flow in the outer chamber past the outer disc in an outward direction, the inner disc elastically deformable away from the chamber wall of the inner chamber to permit fluid flow in the inner chamber past the inner disc in an outward direction, the intermediate disc elastically deformable away from the chamber wall of the intermediate chamber to permit fluid flow in the intermediate chamber past the intermediate disc in an outward direction.

In another aspect, the present invention provides a pump for producing and dispensing foam, comprising:

an air compartment having an inlet and an outlet, a fluid compartment having a fluid inlet and a fluid outlet, the fluid inlet being in flow communication with a fluid containing reservoir, a foam generating member for generating turbulence in air and fluid passing therethrough to produce foam, the foam generating member positioned downstream from the air compartment outlet and the fluid outlet to receive fluid which has been discharged through the fluid outlet and air which has been discharged through the air compartment outlet, a discharge outlet downstream from the foam generating member open to the atmosphere for discharge of any air, fluid and foam discharged outwardly through the foam generating member, the pump comprising a first member and a second member cooperating to define the air compartment and the fluid compartment, the second member being reciprocally slidable with respect to the first member between a withdrawal position and a retracted position, whereby moving the second member in a withdrawal stroke from the retracted position to the extended position pressurizes the air compartment thereby forcing liquid and air through the foam generating member and simultaneously drawing fluid from the reservoir through the fluid inlet into the fluid compartment, and whereby moving the second member in a retraction stroke from the withdrawn position to the retracted position pressurizes the fluid compartment thereby discharging fluid from the fluid compartment out the fluid outlet and simultaneously draws air into the air compartment.

In another aspect, the present invention provides a pump for dispensing liquid and air, comprising:

an air compartment having an inlet and an outlet, a fluid compartment having a fluid inlet and a fluid outlet, the fluid inlet being in flow communication with a fluid containing reservoir, an outlet passageway downstream from the air compartment outlet and the fluid outlet to receive fluid which has been discharged through the fluid outlet and air which has been discharged through the air chamber compartment r outlet, the outlet passageway communicating with a discharge outlet open to the atmosphere for discharge of air and liquid, the pump comprising a first member and a second member cooperating to define the air compartment and the fluid compartment, the second member being reciprocally slidable with respect to the first member between a withdrawal position and a retracted position, whereby moving the second member in a withdrawal stroke from the retracted position to the extended position pressurizes the air compartment thereby forcing liquid and air through the foam generating member and simultaneously drawing fluid from the reservoir through the fluid inlet into the fluid compartment, and whereby moving the second member in a retraction stroke from the withdrawn position to the retracted position pressurizes the fluid compartment thereby discharging fluid from the fluid compartment out the fluid outlet and simultaneously draws air into the air compartment.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
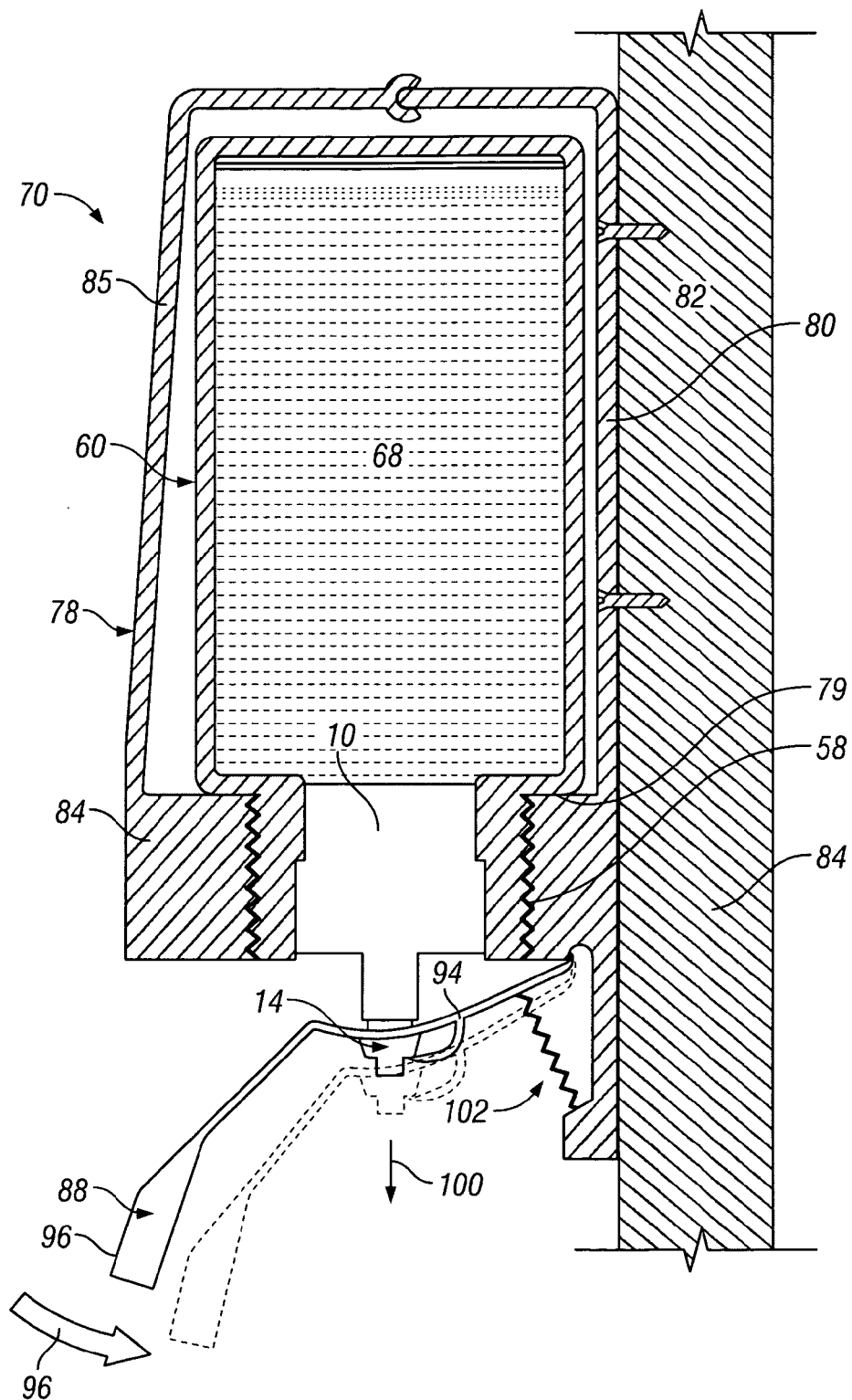
FIG. 1 is a partially cut-away side view of a first preferred embodiment of a liquid dispenser with a reservoir and pump assembly in accordance with the present invention.
Figure 2:
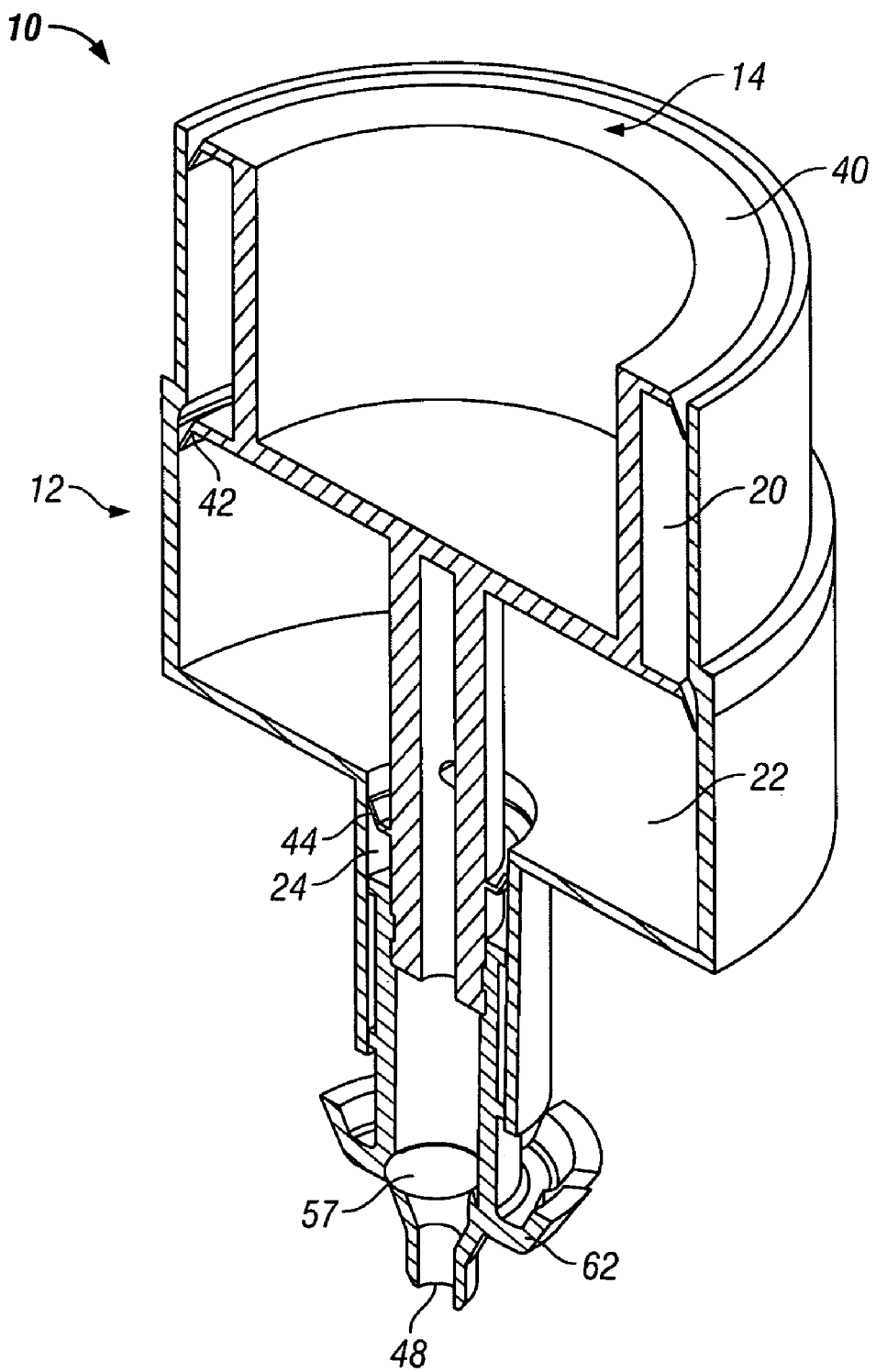
FIG. 2 is a vertically cross-sectioned perspective view of the pump assembly shown in FIG. 1.
Figure 3:
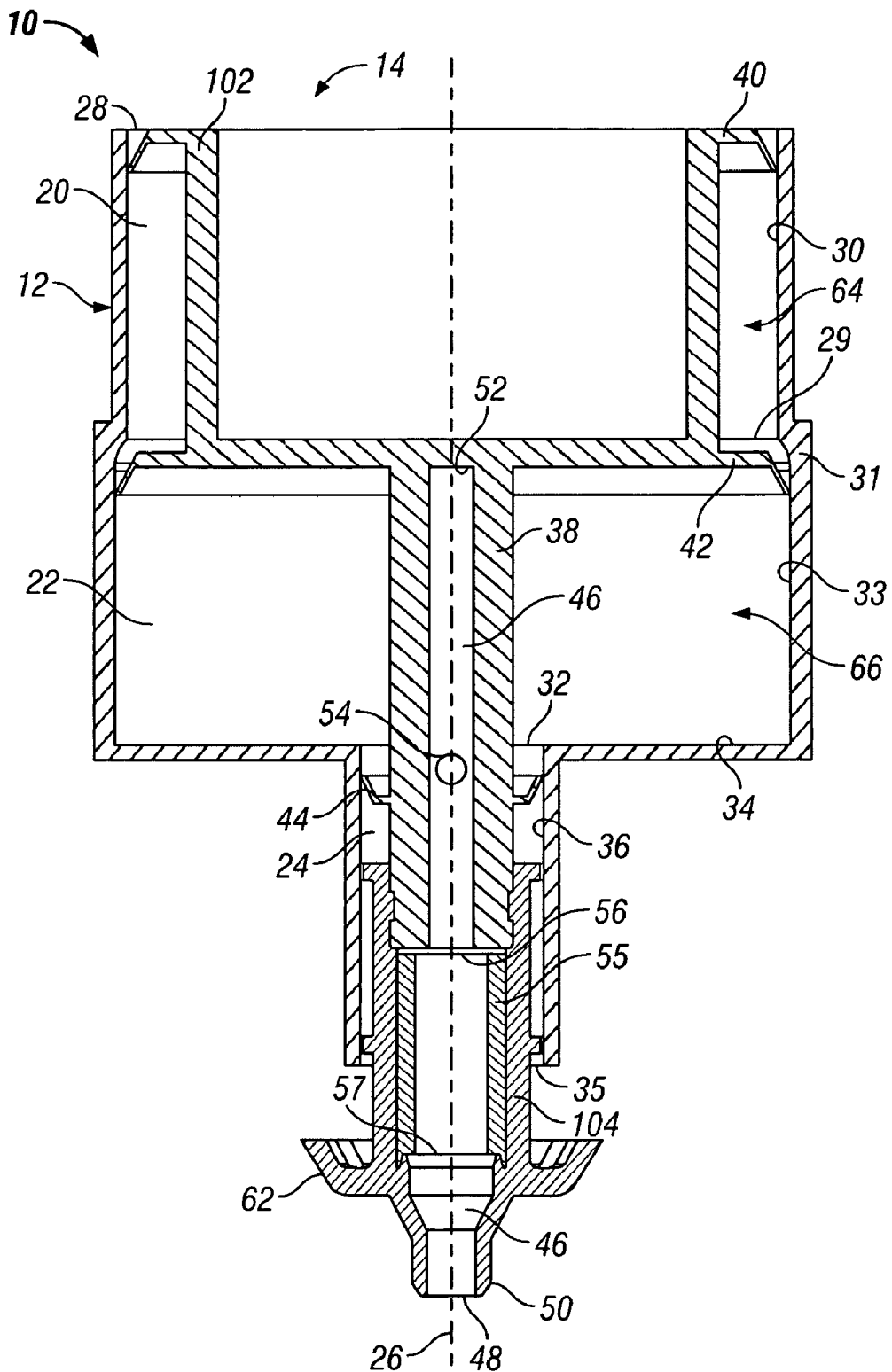
FIG. 3 is a cross-sectional side view of an assembled pump assembly of FIG. 2 showing the piston in a fully retracted position.
Figure 4:
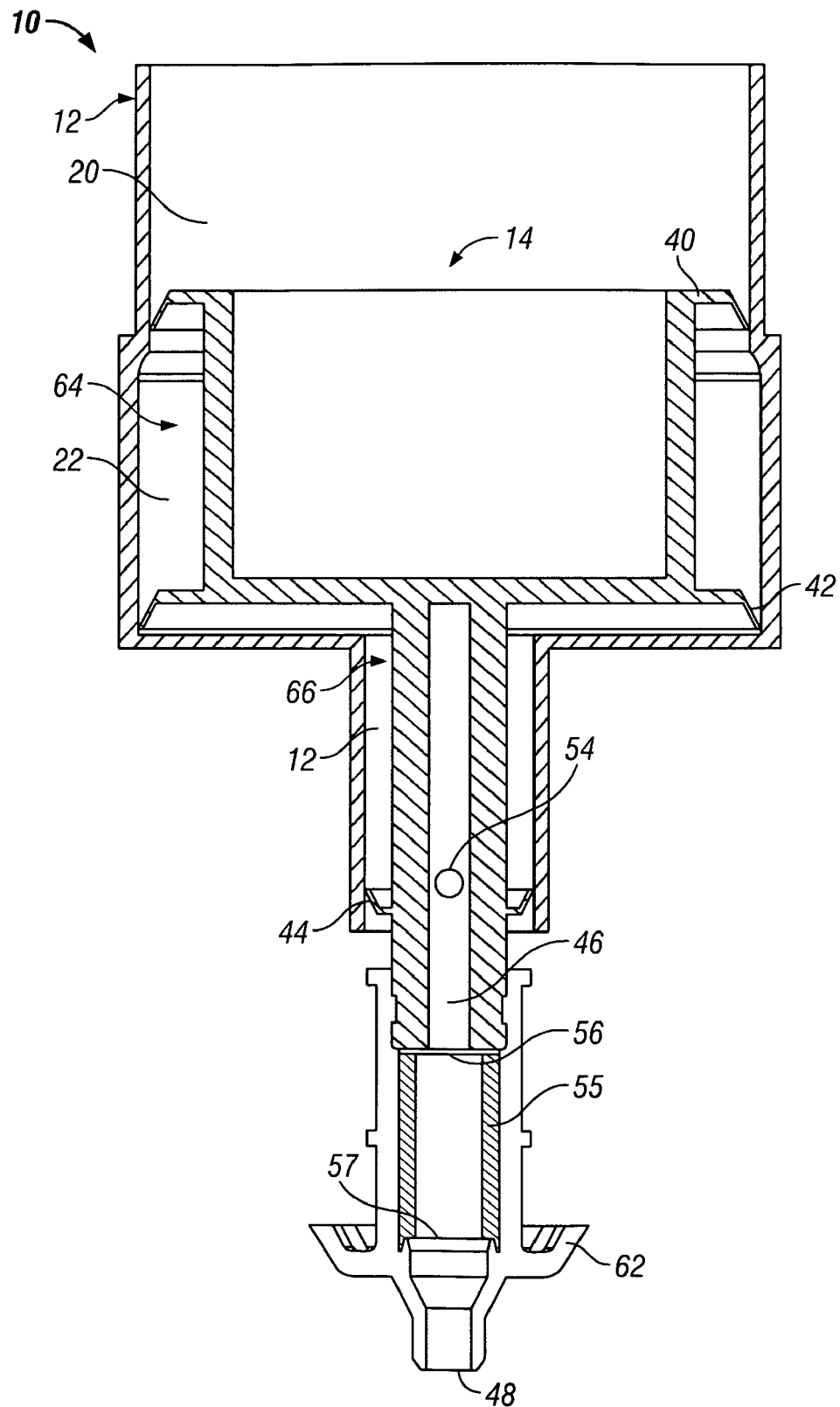
FIG. 4 is the same side view as in FIG. 3 but showing the pump in a fully extended position.

Reference is made to FIG. 1 which shows a liquid soap dispenser generally indicated 70 utilizing the pump assembly 10 of FIGS. 2 to 4 secured in the neck 58 of a sealed, collapsible container or reservoir 60 containing liquid hand soap 68 to be dispensed. Dispenser 70 has a housing generally indicated 78 to receive and support the pump assembly 10 and the reservoir 60. Housing 78 is shown with a back plate 80 for mounting the housing, for example, to a building wall 82. A bottom support plate 84 extends forwardly from the back plate to support and receive the reservoir 60 and pump assembly 10. As shown, the bottom support plate 84 has a circular opening therethrough. The reservoir 60 sits supported on shoulder 79 of the support plate 84 with the neck 58 of the reservoir 60 extending through opening 86 and secured in the opening as by a threaded engagement or, alternatively, by a friction fit, clamping or the like. A cover member 85 is hinged to an upper forward extension 87 of the back plate 80 so as to permit replacement of reservoir 60 and its pump assembly 10.

Support plate 84 carries an actuating lever 88 journalled for pivoting about a horizontal axis at 90. A central portion of the lever 88 carries a hook 94 to engage an engagement disc on a piston 14 of the pump assembly 10 and couple lever 88 to piston 14, such that movement of the lower handle end 96 of lever 88 from the retracted position shown in solid lines to the withdrawn position shown in dashed lines, in the direction indicated by arrow 98 slides piston 14 outwardly in a withdrawal pumping stroke as indicated by arrow 100. On release of the lower handle end 96, spring 102 biases the upper portion of lever 88 upwardly so that the lever moves the piston 14 inwardly to a fully retracted position as seen in solid lines in FIG. 1. Lever 88 and its hook 94 are adapted to permit manual coupling and uncoupling of the hook 94 as is necessary to remove and replace reservoir 60 and pump assembly 10. Other mechanisms for moving the piston can be provided including mechanized and motorized mechanisms.

In use of the dispenser 70, once exhausted, the empty, collapsed reservoir 60 together with the attached pump assembly 10 are removed and a new reservoir 60 and attached pump assembly 10 may be inserted into the housing. Preferably, the removed reservoir 60 with its attached pump assembly 10 are both made entirely out of recyclable plastic material which can easily be recycled without the need for disassembly prior to cutting and shredding.

Reference is made first to FIGS. 2, 3 and 4 which show a first embodiment of the pump assembly 10. The pump assembly 10 is best shown in FIG. 2 as comprising two principal elements, a piston chamber-forming body 12 and a piston 14.

The piston chamber-forming body 12 has three cylindrical portions illustrated to be of different radii, forming three chambers, an inner chamber 20, an intermediate chamber 22, and an outer chamber 24, all coaxially disposed about an axis 26. The intermediate cylindrical chamber 22 is of the largest diameter. The outer cylindrical chamber 24 is of a diameter which is smaller than that of the intermediate cylindrical chamber 22. The inner cylindrical chamber 20 is of a diameter less than that of the intermediate cylindrical chamber 22 and, as well, is shown to be of a diameter which is greater than that of the outer cylindrical chamber 24.

The inner chamber 20 has an inlet opening 28 and an outlet opening 29. The inner chamber has a cylindrical chamber side wall 30. The outlet opening 29 opens into an inlet end of the intermediate chamber 22 from an opening in a shoulder 31 forming an inner end of the intermediate chamber 22. The intermediate chamber 22 has an inlet opening, an outlet opening 32, and a cylindrical chamber side wall 33. The outlet opening 32 of the intermediate chamber 22 opens into an inlet end of the outer chamber 24 from an opening in a shoulder 34 forming the outer end of the intermediate chamber 22. The outer chamber 24 has an inlet opening, an outlet opening 35 and a cylindrical chamber side wall 36.

Piston 14 is axially slidably received in the body 12. The piston 14 has an elongate stem 38 upon which four discs are provided at axially spaced locations. An inner flexing disc 40 is provided at an innermost end spaced axially from an intermediate flexing disc 42 which, in turn, is spaced axially from an outer sealing disc 44. The inner disc 40 is adapted to be axially slidable within the inner chamber 20. The intermediate disc 42 is adapted to be axially slidable within the intermediate chamber 22. The outer sealing disc 44 is adapted to be axially slidable within the outer chamber 24.

The inner disc 40 has a resilient outer peripheral edge which is directed outwardly and is adapted to prevent fluid flow inwardly yet to deflect to permit fluid flow outwardly therepast. Similarly, the intermediate disc 42 has a resilient peripheral edge which is directed outwardly and adapted to prevent fluid flow inwardly yet to deflect to permit fluid flow outwardly therepast. In this regard, each of the inner disc 40 and intermediate disc 42 comprise circular resilient flexible discs each of which extends radially outwardly. The inner disc 40, when engaged with the cylindrical side wall 30 of the inner chamber 20, prevents fluid flow axially inwardly therepast through the inner chamber 20, however, is adapted to have its resilient outer edge deflect radially inwardly to permit fluid flow, under pressure differentials above a predetermined pressure, axially outwardly therepast. The intermediate flexible disc 42, when engaged with the interior wall 33 of the intermediate chamber 22, prevents fluid flow axially inwardly therepast through the intermediate chamber 22, however, is adapted to have its resilient outer edge deflect radially inwardly to permit fluid flow, under pressure differentials above a predetermined pressure, axially outwardly therepast.

The sealing outer disc 44 extends radially outwardly from the stem 38 to sealably engage the side wall 36 of the outer chamber 24, and prevent flow therepast either outwardly or both outwardly and inwardly. In this regard, the outer disc 44 includes an elastically deformable edge portion near the side wall 36 of the outer chamber 24. This edge portion of the outer disc 44 is deflectable radially inwardly so as to permit, under a sufficiently high vacuum, air to flow axially inwardly therepast. In one generally preferred arrangement, the piston 14 may be configured such that all air to be drawn inwardly is drawn inwardly via the outlet 48, however, some proportion of air drawn in may be drawn in past the outer disc 44 by deflection of the outer disc.

The piston 14 essentially forms, as defined between the inner disc 40 and the intermediate disc 42, an annular inner compartment 64 which opens radially outwardly as an annular opening between the discs 40 and 42. Similarly, the piston 14 effectively forms between the intermediate sealing disc 42 and the outer sealing disc 44 an annular outer compartment 66 which opens radially outwardly as an annular opening between the discs 42 and 44.

In the first embodiment of FIGS. 2 to 4 in a withdrawal stroke, the inner annular compartment 64 is under vacuum and the outer annular compartment 66 is under pressure. Thus, in a withdrawal stroke, the intermediate disc 42 between the compartment 64 and the compartment 66 is biased into a sealing condition with the side wall 30 of the inner chamber 20 both by the vacuum on its inner surfaces and the complementary pressure on its outer surfaces. As well, in a retraction stroke, the inner annular compartment 64 is under pressure and the outer annular compartment 66 is under a vacuum. Thus, in a retraction stroke, the intermediate disc 42 between the compartment 64 and the compartment 66 is biased downwardly to an unsealed condition with the side wall 30 of the inner chamber 20 by both the pressure on its inner surfaces and the complementary vacuum on its outer surfaces. The complementary pressures, that is, pressure on one side and vacuum on the other side of the intermediate disc 42 in both the withdrawal stroke and the retraction stroke reduces the need for the intermediate disc 42 to be able to inherently assume a sealed condition and to have a resilient outer periphery permitting relatively simple configuration for the disc 42 to adequately perform in practical applications, and a lessening of a need for close tolerances in the manufacture of the disc 42 and the intermediate chamber 22.

An outermost portion of the stem 38 is hollow with a central passageway 46 extending from an outlet 48 at the outermost end 50 of the stem 38 centrally through the stem 38 to a closed inner end 52. A radially extending inlet 54 extends radially through the stem into the passageway 46, with the inlet 54 being provided on the stem 38 in between the intermediate disc 42 and the outer disc 44. The inlet 54 is preferably disposed as shown proximate the outer disc 44 such that liquid in the bottom of the compartment 66 will be at or close to a height of the inlet 54 and will be urged out the inlet 54 in a withdrawal stroke. While not necessary, as shown in FIG. 3 in the retracted position, the outlet 54 is preferably within the outer chamber 24 so that liquid in the bottom of the outer chamber 66 will be proximate the outlet 54, and is of assistance in minimizing the number of strokes of the piston 14 on initial charging of an empty pump assembly before dispensing of foam occurs.

The piston 14 is shown as formed from two main elements, an inner piston element 102 and an outer piston element 104 which are secured together capturing a foam producing element therebetween within an enlarged section of the passageway 46. The foam producing member as shown in FIGS. 3 and 4 comprises two screens 56 and 57 held axially spaced by a hollow spacing tube 55. For simplicity of illustration, FIG. 2 merely shows the screen 57 and not the screen 56 or spacing tube 55.

The foam-inducing member is provided in the passageway 46 intermediate between the inlet 54 and the outlet 48. The screens 56 and 57 may be fabricated of plastic, wire or cloth material. It may comprise a porous ceramic member. The screens 56 and 57 provides small apertures through which an air and liquid mixture may be passed to aid foam production as by production of turbulent flow through the small pores or apertures of the screen thereof in a known manner. While two screens 56 and 57 are shown to produce foam, other foam producing members may be used preferably being porous members, preferably with small openings therethrough preferably to produce turbulence in fluid passing therethrough.

The piston 14 carries an engagement flange or disc 62 on the stem 38 outward from the outer sealing disc 44. Engagement disc 62 is provided for engagement by an activating device in order to move the piston 14 in and out of the body 12. The outer piston element 104 is shown to carry the engagement flange 62.

In a withdrawal stroke from the position of FIG. 3 to the position of FIG. 4, the volume of the annular outer compartment 66 between the intermediate disc 42 and the outer disc 44 decreases such that air and liquid in the annular outer compartment 66 and in the passageway 46 above the screen 57 is forced under pressure out through the screen 57 commingling and producing foam. At the same time, in the withdrawal stroke, the volume of the annular inner compartment 64 between the inner disc 40 and the intermediate disc 42 increases drawing liquid from inside a reservoir past the inner disc 40.

In a retraction stroke with movement from the extended position of FIG. 4 to the retracted position of FIG. 3, the volume of the annular inner compartment 64 between the inner disc 40 and the intermediate disc 42 decreases such that fluid is displaced outwardly past the intermediate disc 42 to between the intermediate disc 42 and the outer disc 44. At the same time, the volume of the annular outer compartment 66 between the intermediate disc 42 and the outer disc 44 increases, with such increase being greater than the volume decrease between the inner disc 40 and the intermediate disc 42 such that in addition to the fluid displaced outwardly past intermediate disc 42, air is drawn inwardly via the outlet 48, passageway 46, and the inlet 54 into the annular outer compartment 66 between the intermediate disc 42 and the outer disc 44.

Reciprocal movement of the piston 14 between the retracted and extended positions will successively draw and pump precise amounts of fluid from a container and mix such fluid with air from the atmosphere and dispense the fluid commingled with the air as a foam.

Operation of the pump assembly illustrated in FIGS. 2 to 4 will draw liquid out of a container creating a vacuum therein. The pump assembly is preferably adapted for use with a collapsible container. Alternatively, a suitable vent mechanism may be provided if desired as, for example, for use in a non-collapsible container to permit atmospheric air to enter the container and prevent a vacuum being built up therein which prevents further dispensing.

It is to be appreciated that the inner disc 40 and the intermediate disc 42 form a first stepped pump and, similarly, the intermediate disc 42 and the outer disc 44 form a second stepped pump. The first pump and second pump are out of phase in the sense that in any one retraction or extension stroke while one pump is drawing fluid in, the other is discharging fluid out.

Both the piston 14 and the body 12 may be formed as from plastic as by injection moulding.

The body 12 is shown as formed as a unitary element by injection moulding with the stepped increase in diameter from the inner chamber 20 to the intermediate chamber 22 selected to be sufficiently small that a mould core to form the larger diameter intermediate chamber 22 may be withdrawn through the inner chamber 20. In this regard, to facilitate the mould core removal, the shoulder 31 is shown to provide a smooth transition from the chamber 22 to the chamber 20. Alternatively, the body 12 may be formed from two or more separate portions, for example, one including the cylindrical wall 30 of the inner chamber 20 and the shoulder 31, and the other including the cylindrical wall 33 of the intermediate chamber 22.

In the embodiment of FIGS. 2 to 4, having the outer chamber 24 to have a smaller diameter than the intermediate chamber 22 assist in the outer chamber 24 acting as a sump to receive liquid under the effective gravity in the outer compartment 66. This accumulation of liquid in the outer chamber 24 can be assisted by sloping the shoulder 34 between the intermediate chamber 22 and the outer chamber 24 outwardly and inwardly as, for example, to be frustoconical and guide liquid under gravity into the outer chamber 24 towards assisting that on expelling fluid from the outer chamber 24, liquid in the bottom of the outer chamber 24 is at least initially expelled.

The first embodiment shows dispensers for passing liquid and air through screens 56 and 57 to dispense the liquid as a foam. The screens 56 and 57 can be eliminated in which case the dispenser illustrated could serve to dispense liquid with air. The foaming screens could be replaced by another orifice device such as an atomizing nozzle to produce a mist or spray.

Figure 5:
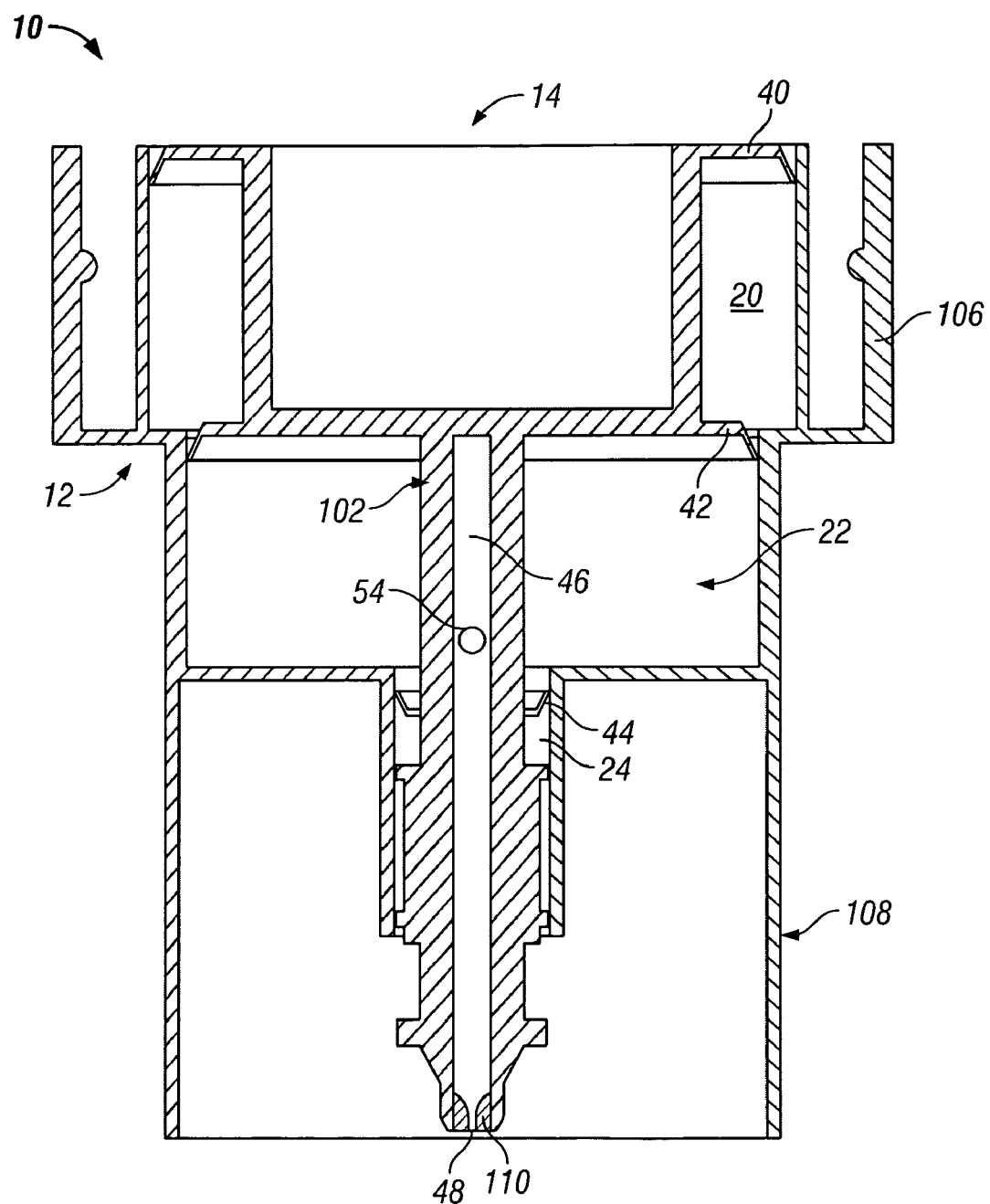
FIG. 5 is a cross-sectional side view of a pump assembly in accordance with a second embodiment of the present invention showing the piston in a fully retracted position.

Reference is now made to FIG. 5 which illustrates a second embodiment of a pump assembly in accordance with the present invention in a retracted position. Throughout the drawings, the same reference numerals are used to refer to like elements. The second embodiment of FIG. 5 is identical to the first embodiment of FIG. 2 to 4 but for four exceptions.

The first exception is that the inner chamber 20 has a diameter which is larger than the diameter of the intermediate chamber 22.

The second exception is that the piston chamber-forming body 12 carries an internally threaded collar 106 adapted to threadably secure the piston chamber-forming body 12 to the neck of a bottle or reservoir not shown.

The third exception is that the piston chamber-forming body 12 has been provided with a protective shroud 108 effectively comprising an outward extension of the intermediate chamber wall 33 from the shoulder 34 so as to provide protection to the piston 14 when in the retracted position as can be useful during shipping and handling and, for example, reduce the need for a separate removable protective cover.

The fourth exception includes the construction of the piston so that the inner portion 102 carries the engagement disc 62 which is of reduced diameter so as to permit the portion of the piston 14 carrying the engagement flange to be inserted outwardly through the outer chamber as can permit any pre-assembly of the piston before coupling to the body 12.

The fifth exemption is that the foam inducing member has been removed and replaced by a nozzle member 110 carried as a smaller sized outer portion of the piston 14 located in the passageway 46 near the outlet 48 with the nozzle member having an aperture therethrough adapted to discharge air and liquid as a spray or air mist.

One or more the collar 106, the protective shroud 108, the reduced diameter engagement disc 62 and the nozzle 110 could similarly be provided on the first embodiment of FIGS. 2 to 4.

From the retracted position shown in FIG. 5, in moving outwardly in a withdrawal stroke, the volume between the intermediate disc 42 and the outer disc 44 decreases such that air and liquid therebetween and in the passageway 46 is forced under pressure out through the nozzle member 110. At the same time, in the withdrawal stroke, the volume between the inner disc 40 and the intermediate disc 42 decreases such that fluid is displaced outwardly past the intermediate disc 42 to between the intermediate disc 42 and the outer disc 44.

In a retraction stroke with movement from a withdrawn position inwardly toward to the retracted position of FIG. 5, the volume between the inner disc 40 and the intermediate disc 42 increases such that fluid is drawn outwardly past the inner disc 40 to between the inner disc 40 and the intermediate disc 42. At the same time, the volume between the intermediate disc 42 and the outer disc 44 increases such that atmospheric air is drawn inwardly via the outlet 48, passageway 46, and the inlet 54 to in between the intermediate disc 42 and the outer disc 44, together with any air and any liquid in the passageway.

As with the first embodiment of FIG. 2 to 4, the inner disc 40 and the intermediate disc 42 form a first stepped pump and, similarly, the intermediate disc 42 and the outer disc 44 form a second stepped pump. In contrast with the first embodiment of FIG. 2 to 4 in which the first pump and second pump are out of phase in the sense that in any one retraction or extension stroke while one pump is drawing fluid in, the other is discharging fluid out, in the second embodiment of FIG. 5 the first pump and second pump are in phase in the sense that in any retraction stroke both the first pump and the second pump are drawing fluid in, and in any extension stroke both the first pump and the second pump are discharging fluid out.

It is to be appreciated that the nature of the liquid to be dispensed including its viscosity and flow characteristics will be important in order for a person skilled in the art to make suitable selection of the relative sizes and dimensions and resistance to flow provided by the various passageways, inlets, outlets and screens and/or past the various discs. As well, the quantity of liquid desired to be dispensed in each stroke will have a bearing on the relative proportion and sizing of the components including particularly the inner compartment 64, outer compartment 66 and the axial length of a stroke of the piston.

In the preferred embodiments, the engagement disc 62 is provided on the piston 14 for engagement to move the piston inwardly and outwardly. It is to be appreciated that various other mechanisms can be provided for engagement and movement of the piston relative the body 12.

The preferred embodiments of the invention show passageway 46 for dispensing of the air and/or liquid as being provided internally within a piston. Such an arrangement is believed preferred from the point of view of ease of construction of the pump assembly 10. However, it is to be appreciated that passageways for dispensing the liquid and/or foam may be provided, at least partially, as part of the body 12 or removably mounted to the body 12.

In accordance with the preferred embodiment illustrated, the relative buoyancy of air within the liquid and, hence, the separation of air and liquid due to gravity are utilized as, for example, to permit liquid in the outer compartment 66 to flow downwardly in the outer chamber 24 to be disposed proximate the outlet 54. It is to be appreciated, therefore, that the pump assembly 10 in accordance with the presence invention should preferably be disposed with what has been referred to as the inner end of the pump assembly at a height above the height of the outer outlet end.

Figure 6:
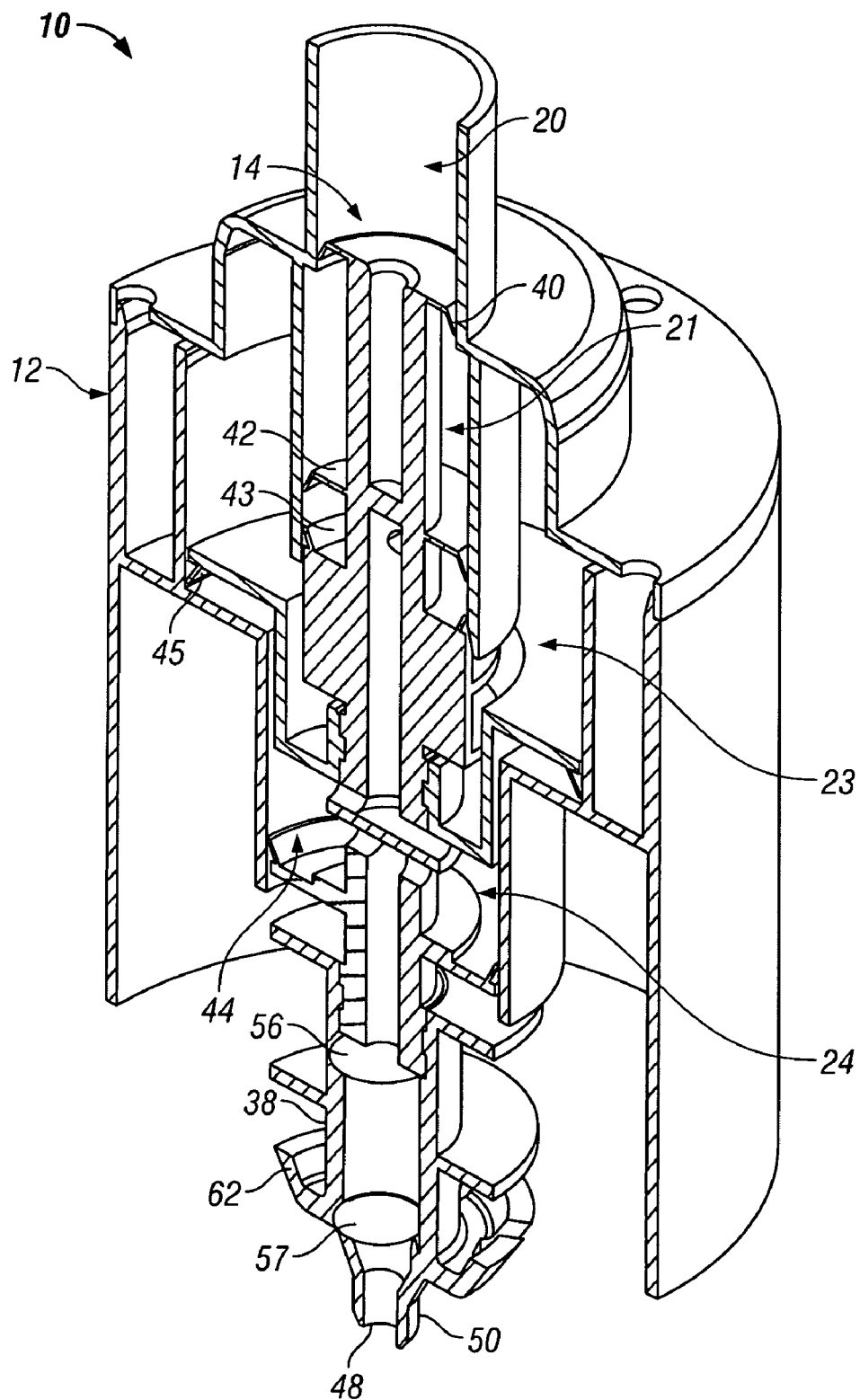
FIG. 6 is a vertically cross-sectioned perspective view of a pump assembly in accordance with a third embodiment of the present invention.
Figure 7:
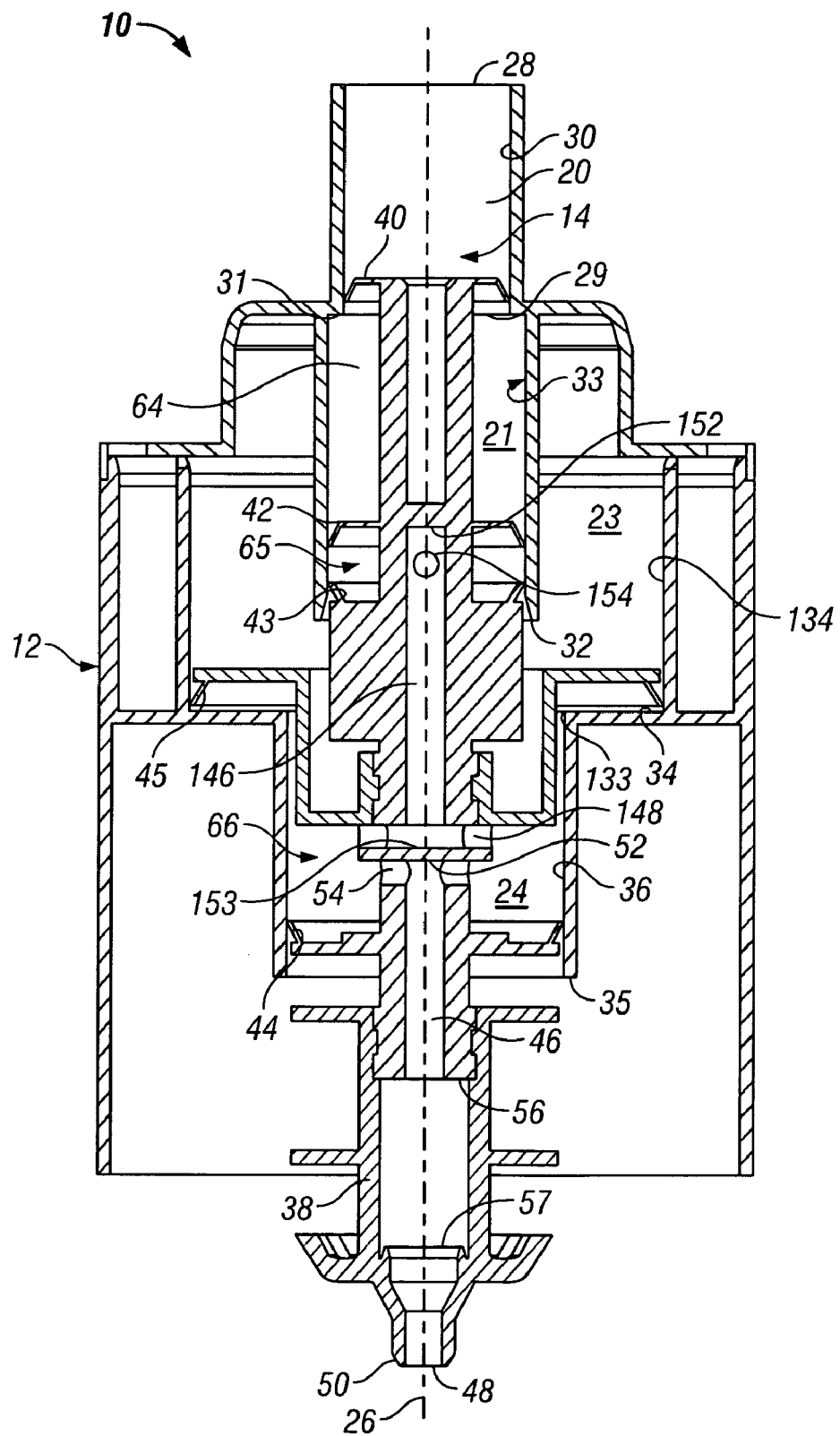
FIG. 7 is the same side view as in FIG. 6 but showing the pump in a fully extended position.

Reference is made to FIGS. 6 and 7 which show a third embodiment of the pump assembly 10. The pump assembly comprises two principal elements, a piston chamber-forming body 12 and a piston 14 which together form a first inner liquid pump and a second outer air pump.

The piston chamber-forming body 12 has four cylindrical portions illustrated to be of different radii, forming four chambers, an inner chamber 20, an inner intermediate chamber 21, an outer intermediate chamber 23, and an outer chamber 24, all coaxially disposed about an axis 26. The inner cylindrical chamber 20 is of a diameter less than that of the inner intermediate cylindrical chamber 21. The outer intermediate cylindrical chamber 23 is of a diameter which is greater than that of the outer cylindrical chamber 24.

The inner chamber 20 has an inlet opening 28 and an outlet opening 29. The inner chamber has a cylindrical chamber side wall 30. The outlet opening 29 opens into an inlet end of the inner intermediate chamber 21 from an opening in a shoulder 31 forming an inner end of the inner intermediate chamber 21.

The inner intermediate chamber 21 has an inlet opening, an outlet opening 32, and a cylindrical chamber side wall 33. The outlet opening 32 of the inner intermediate chamber 21 opens into the outer intermediate chamber 23.

The outer intermediate chamber 23 has an outlet opening 133 and a cylindrical chamber side wall 134. The outlet opening of the outer intermediate chamber 23 opens into the outer chamber 24 from an opening in a shoulder 34 forming the outer end of the outer intermediate chamber 23. The outer chamber 24 has an inlet opening, outlet opening 35 and a cylindrical chamber side wall 36.

Piston 14 is axially slidably received in the body 12. The piston 14 has an elongate stem 38 upon which six discs are provided at axially spaced locations. A flexing inner disc 40 is provided at an innermost end spaced axially from a flexing inner intermediate disc 42 which, in turn, is spaced axially from a sealing inner intermediate disc 43. The inner disc 40 is adapted to be axially slidable within the inner chamber 20. The flexing inner intermediate disc 42, and the sealing inner intermediate disc 43 are adapted to be axially slidable within the inner intermediate chamber 21. An outer intermediate disc 45 is provided adapted to be axially slidable within the outer intermediate chamber 23. A sealing outer disc 44 is spaced axially from the outer intermediate disc 45 and adapted to be axially slidable within the outer cylindrical chamber 24.

The inner disc 40 has a resilient outer peripheral edge which is directed outwardly and is adapted to prevent fluid flow inwardly yet to deflect to permit fluid flow outwardly therepast in the inner chamber 20. The flexing inner intermediate disc 42 has a resilient peripheral edge which is directed outwardly and adapted to prevent fluid flow inwardly yet to deflect to permit fluid flow outwardly therepast in the inner intermediate chamber 21. The sealing inner intermediate disc 43 is adapted to be axially slidable within the inner intermediate chamber 21. The sealing inner intermediate disc 43 extends radially outwardly from the stem 38 to sealably engage the side wall of the inner intermediate chamber 21, and prevent flow therepast either outwardly or both outwardly and inwardly.

The flexing outer intermediate disc 45 has a resilient peripheral edge which is directed outwardly and adapted to prevent fluid flow inwardly yet to deflect to permit fluid flow outwardly therepast in the outer intermediate chamber 23. The outer sealing disc 44 is adapted to be axially slidable within the outer cylindrical chamber 24. The outer sealing disc 44 extends radially outwardly from the stem 38 to sealably engage the side wall 36 of the outer chamber 24, and prevent flow therepast either outwardly or both outwardly and inwardly.

The piston 14 essentially forms, as defined between the inner disc 40 and the flexing inner intermediate disc 42, an annular inner compartment 64 which opens radially outwardly as an annular opening between the discs 40 and 42. Similarly, the piston 14 effectively forms between the flexing inner intermediate disc 42 and the sealing inner intermediate sealing disc 43 an annular outer intermediate compartment 65 which opens radially outwardly as an annular opening between the discs 42 and 43. Similarly, the piston 14 effectively forms between the outer intermediate sealing disc 45 and the outer disc 44 an annular outer compartment 66 which opens radially outwardly as an annular opening between the discs 45 and 44.

An outermost portion of the stem 38 is hollow with a central outer passageway 46 extending from an outlet 48 at the outermost end 50 of the stem 38 centrally through the stem 38 to a closed inner end 52. A radially extending inlet 54 extends radially through the stem into the outer passageway 46, with the inlet 54 being provided on the stem in between the outer disc 44 and the outer intermediate disc 45. A foam inducing member including screens 56 and 56 is provided in the outer passageway 46 intermediate between the inlet 54 and the outlet 48 to aid foam production as by production of turbulent flow through small pores or apertures of the screen thereof in a known manner.

An intermediate portion of the stem 38 is also hollow with a central inner passageway 146 extending from an inner closed end 152 to an outer closed end 153. A radially extending inlet 154 extends radially through the stem into the inner passageway 146, with the inlet 154 being provided on the stem in between the flexing inner intermediate disc 42 and the sealing inner intermediate disc 43. A radially extending outlet 148 extends radially through the stem 38 from the inner passageway 146, to between the outer intermediate disc 45 and the outer disc 44.

The piston 14 also carries an engagement flange or disc 62 on the stem 38 outward from the outer sealing disc 44. Engagement disc 62 is provided for engagement by an activating device in order to move the piston 14 in and out of the body 12.

The first inner liquid pump comprises a stepped cylinder pump formed by inner chamber 20 and the inner intermediate chamber 21 interacting with the piston 14 carrying the inner disc 40, the flexing inner intermediate disc 42 and the sealing inner intermediate sealing disc 43, such that liquid from the reservoir is in a withdrawal stroke drawn from the reservoir into the annular inner compartment 64 between the inner disc 40 and the flexing inner intermediate disc 42 and in a retraction stroke liquid in the annular inner compartment 64 is forced outwardly past the inner intermediate flexing disc 42 into an annular outer intermediate compartment 65 and then via the inlet 154, inner passageway 146 and the outlet 148 into the annular outer compartment 66.

The second outer air pump comprises a stepped cylinder pump formed by the outer intermediate chamber 23 and the outer chamber 24 interacting with the piston 14 carrying the outer intermediate disc 45 and the outer disc 44, such that air and liquid in the outer compartment 66 is in a withdrawal stroke forced from the outer compartment 66 via the inlet 54, outer passageway 46 and out the outlet 48, and in a retraction stroke atmospheric air plus air and/or liquid in the outer passageway 46 is drawn into the outer compartment 66 via the outlet 48, outer passageway 46 and inlet 54.

In the third embodiment of FIGS. 6 and 7 like the first embodiment of FIGS. 2 to 4, the first pump is out of phase with the second pump, in the sense that in any one retraction or extension stroke while one pump is drawing fluid in, the other is discharging fluid out.

Figure 8:
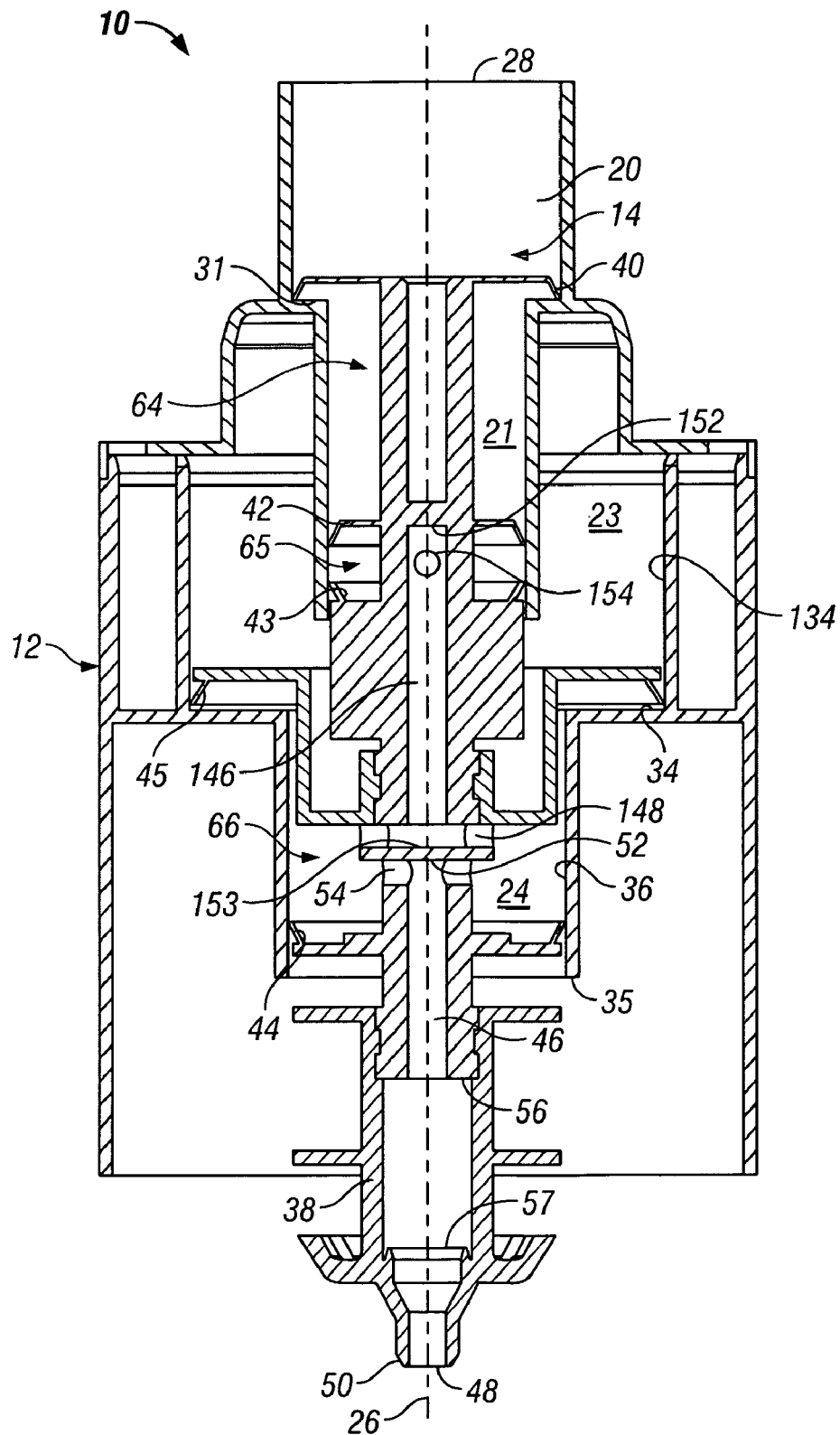
FIG. 8 is a cross-sectional side view of a pump assembly in accordance with a fourth embodiment of the present invention showing the piston in a fully retracted position.

Reference is now made to FIG. 8 which illustrates a fourth embodiment of a pump assembly in accordance with the present invention in a retracted position identical to the third embodiment of FIGS. 6 and 7 with the first exception that the inner chamber 40 has a diameter which is larger than the diameter of the inner intermediate chamber.

From the retracted position shown in FIG. 8, in moving outwardly in a withdrawal stroke the volume between the inner disc 40 and the flexing inner intermediate disc 42 decreases such that fluid is displaced outwardly past the flexing sealing inner intermediate disc 42 to between the flexing inner intermediate disc 42 and the sealing inner intermediate disc 43. In a retraction stroke with movement from a withdrawn position inwardly toward to the retracted position of FIG. 8, the volume between the inner disc 40 and the flexing inner intermediate disc 42 increases such that fluid is drawn outwardly past the inner disc 40 to between the inner disc 40 and the flexing inner intermediate disc 42.

In the fourth embodiment of FIG. 8 like the first embodiment of FIG. 5, the first pump is in phase with the second pump, in the sense that in any retraction stroke both the first pump and the second pump are drawing fluid in, and in any extension stroke both the first pump and the second pump are discharging fluid out.

Figure 9:
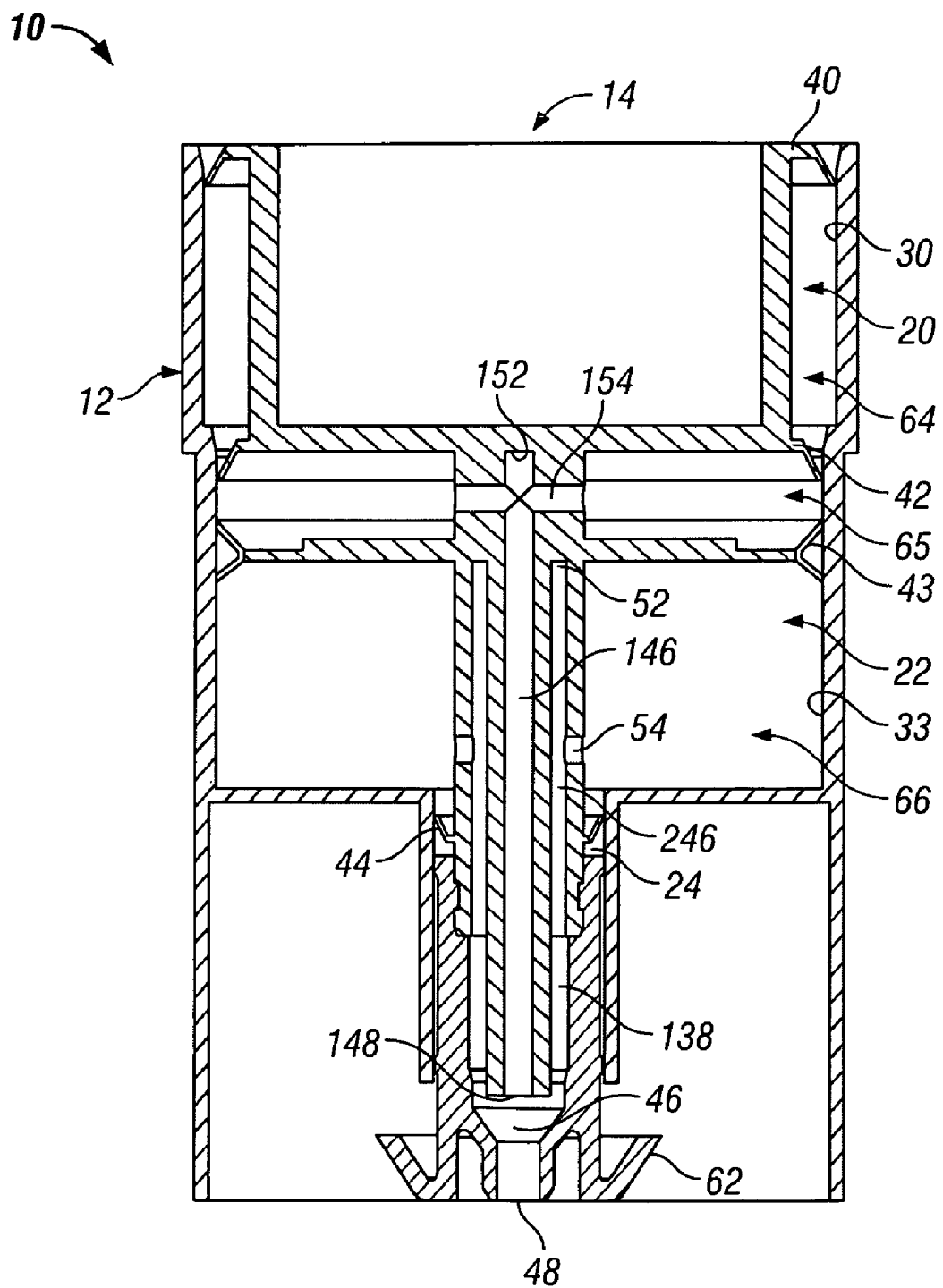
FIG. 9 is a cross-sectional side view of a pump assembly in accordance with a fifth embodiment of the present invention showing the piston in a fully retracted position.

Reference is made to FIG. 9 which illustrates a fifth embodiment of a pump assembly in accordance with the present invention in a retracted position. The pump assembly 10 of FIG. 9 comprises two principal elements, a piston chamber-forming body 12 and a piston 14. The piston chamber-forming body is substantially identical to the body 12 shown in FIG. 5 with the exception that the threaded collar 106 is not included. The body 12 includes the inner chamber 20, intermediate chamber 22 and outer chamber 24 with the inner chamber 20 being of a greater diameter than the intermediate chamber 22 and the intermediate chamber being of a greater diameter than the outer chamber 24.

A flexing inner disc 40 is provided at an innermost end spaced axially from a flexing inner intermediate disc 42 which, in turn, is spaced axially from a sealing outer intermediate disc 43. The inner disc 40 is adapted to be axially slidable within the inner chamber 20. The flexing inner intermediate disc 42, and the sealing outer intermediate disc 43 are adapted to be axially slidable within the intermediate chamber 22. A sealing outer disc 44 is spaced axially from the sealing outer intermediate disc 43 and adapted to be axially slidable within the outer cylindrical chamber 24.

The inner disc 40 has a resilient outer peripheral edge which is directed outwardly and is adapted to prevent fluid flow inwardly yet to deflect to permit fluid flow outwardly therepast in the inner chamber 20. The flexing inner intermediate disc 42 has a resilient peripheral edge which is directed outwardly and adapted to prevent fluid flow inwardly yet to deflect to permit fluid flow outwardly therepast in the intermediate chamber 22. The sealing outer intermediate disc 43 is adapted to be axially slidable within the intermediate chamber 22. The sealing outer intermediate disc 43 extends radially outwardly from the stem 38 to sealably engage the side wall of the intermediate chamber 22, and prevent flow therepast both outwardly and inwardly. The outer sealing disc 44 extends radially outwardly from the stem 38 to sealably engage the side wall 36 of the outer chamber 24, and prevent flow therepast either outwardly or both outwardly and inwardly.

The piston 14 essentially forms, as defined between the inner disc 40 and the flexing inner intermediate disc 42, an annular inner compartment 64 which opens radially outwardly as an annular opening between the discs 40 and 42. Similarly, the piston 14 effectively forms between the flexing inner intermediate disc 42 and the sealing outer intermediate sealing disc 43 an annular outer intermediate compartment 65 which opens radially outwardly as an annular opening between the discs 42 and 43. Similarly, the piston 14 effectively forms between the outer intermediate sealing disc 43 and the outer disc 44 an annular outer compartment 66 which opens radially outwardly as an annular opening between the discs 43 and 44.

The piston 14 also carries an engagement flange or disc 62 on the stem 38 outward from the outer sealing disc 44. Engagement disc 62 is provided for engagement by an activating device in order to move the piston 14 in and out of the body 12.

The stem 38 is hollow having a central passageway 46 open at an outlet 48 and closed at an inner end 52. An axially extending inlet 54 extends radially through the stem into the passageway 46 with the inlet 54 being provided on the stem in between the outer disc 44 and the outer intermediate disc 43. A center tube 138 is provided coaxially within the passageway 46. The tube 138 has a central passageway 146 coaxially therein open at an outlet end 148 within the passageway 46 and closed at an inner end 152. A radially extending inlet 154 extends radially through the stem into the inner passageway 146, with the inlet 154 being provided on the stem in between the flexing intermediate disc 42 at the sealing outer intermediate disc 43.

A first inner liquid pump comprises a stepped cylinder pump formed by inner chamber 20 and the intermediate chamber 22 interacting with the piston 14 carrying the inner disc 40, the flexing inner intermediate discs 42 and the sealing outer intermediate discs 43, such that fluid from the reservoir is in a retraction stroke drawn from the reservoir into the annular inner compartment 64 between the inner disc 40 and the flexing intermediate disc 42 and, in a withdrawal stroke, liquid in the annular inner compartment 64 is forced outwardly past the inner intermediate flexing disc 42 into the annular intermediate compartment 65 and then via the inlet 154, the inner passage 146 discharged out the outlet 148 into the passageway 46.

The second outer air pump comprises a stepped cylinder pump formed by the intermediate chamber 22 and the outer chamber 24 interacting with the piston 14 carrying the outer intermediate disc 43 and the outer disc 44, such that air in the outer compartment 66 is in a withdrawal stroke forced from the outer compartment 66 via the inlet 54, the outer passageway 46 to out of the outlet 48 and in a retraction stroke atmospheric air is drawn into the outer compartment via the outlet 48, outer passageway 46 and the inlet 54.

As seen in FIG. 9, annularly about the central tube 138, the outer passageway 46 forms an annular space 246 radially outwardly of the inner tube 138. In the withdrawal stroke, air which is forced out of the outer compartment 66 is directed through the annular space 246 annularly about the central tube 138 forming an annular tube or wall of air about a central stream of fluid being simultaneously dispensed from the central outlet 148. Such annular tube of air is preferably travelling in the withdrawal stroke at a higher velocity than the liquid being forced out of the inner tube 138 through the outlet 148 and the annular tube of air can assist in urging the liquid to exit the outlet 48 as by an effect, with such flow of air assisting in ensuring that at the end of a stroke, all of the liquid which has exited from the outlet 148 become to be dispensed out of the outlet 48. The embodiment of FIG. 9 is advantageous for use with relatively thick fluid such as lotions and creams and can assist in ensuring that substantially all of the cream which has exited from the outlet 148 is dispensed from the outlet 48 and to reduce difficulties in respect of dripping of the cream from the outlet 48.

Figure 10:
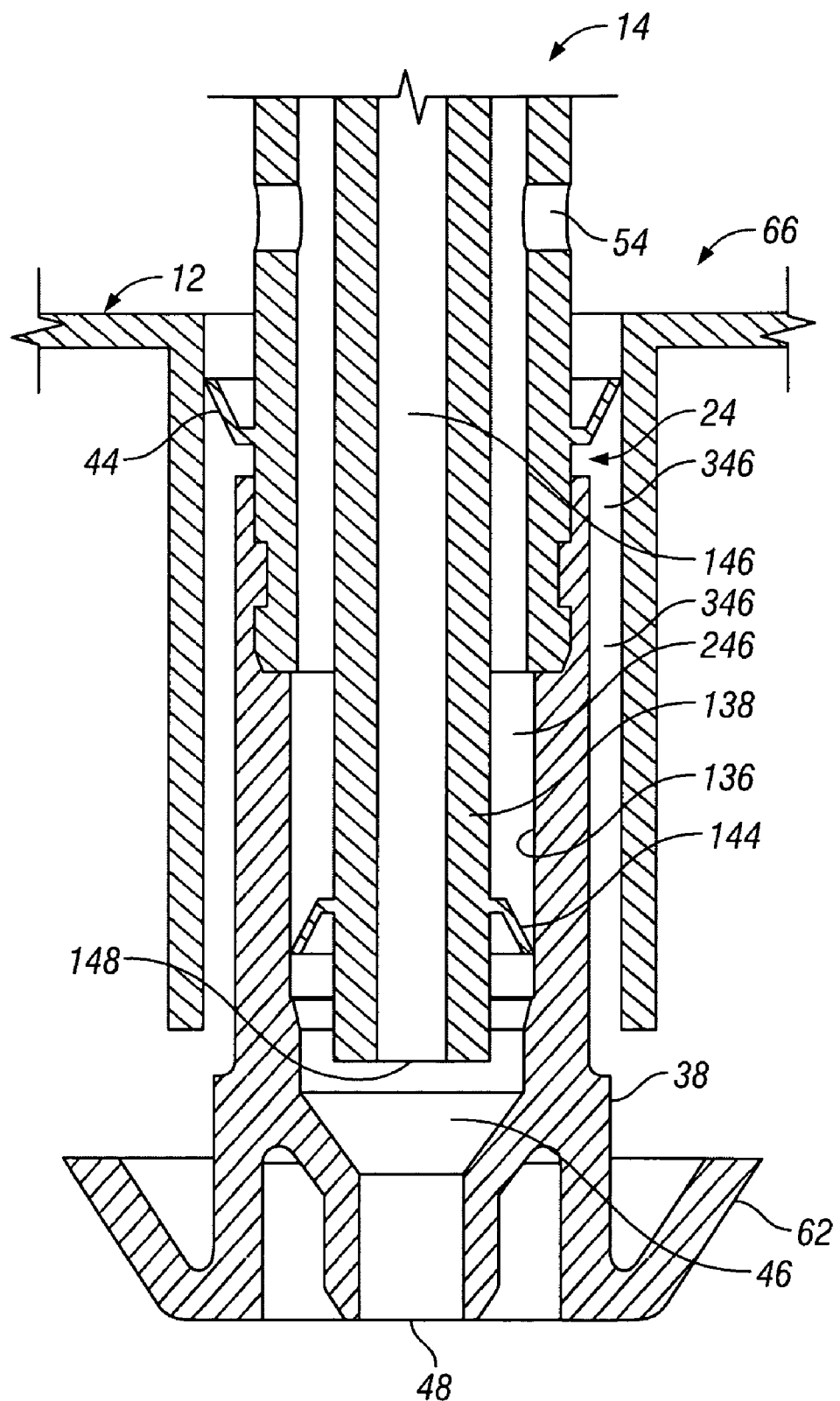
FIG. 10 is an enlarged view of a portion of the pump assembly shown in FIG. 9 illustrating alternate features.

Reference is made to FIG. 10 which illustrates an enlarged portion of the pump assembly 10 shown in FIG. 9 as being a pump assembly which is identical to that shown in FIG. 9 with two exceptions. The first exception is that on the central tube 138, a flexing outer disc 144 is provided to extend outwardly from the central tube 138 and engage the radially inwardly directed side wall 136 of the passageway 146. The flexing outer disc 144 is adapted to be axially slidable within the passageway 46. The outer disc 144 has a resilient outer peripheral edge which is directed outwardly and is adapted to prevent fluid flow inwardly yet to deflect to permit fluid flow outwardly therepast as by having its resilient outer edge deflect radially inwardly to permit fluid flow under pressure differentials above a pre-determined pressure, axially outwardly therepast.

The second exception is that an annular flute-like channelway 346 is provided in an outer surface of the stem 38 between the engagement flange 62 and the outer disc 44 so as to provide for air communication from outside the body 12 into the outer chamber 24.

In operation, the outer disc 144 permits air to pass outwardly therepast through the annular opening 246 yet to prevent air to pass inwardly therepast. In a retraction stroke, atmospheric air may enter the outer compartment 66 by flowing through the slotway 364 to the outer disc 44 which is to be configured to have its resilient outer edge deflect radially inwardly to permit air flow therepast.

The provision of the outer disc 144 can assist in ensuring that fluid discharged from the outlet 148 or in the outlet 48 is not drawn inwardly into the chamber 66. The relative resiliency of the outer disc 144 can be adjusted to require air pressure to be developed within the chamber 66 before air may be released through the annular opening 248. The relative resiliency of the outer disc 44 may be adjusted so as to permit relative ease of air flow therepast into the chamber 66.

As a further embodiment to be appreciated that an arrangement similar to FIG. 10 could be provided, however, including the channelway 346 but excluding the outer disc 144. The annular opening 246 could be restricted at least one location to reduce its cross-sectional area such that in a retraction stroke, insofar as any fluid may come to be in the reduced diameter section, that the restriction on air flow inwardly would cause the outer disc 44 to flex permitting air flow into the chamber 66 rather than drawing of the fluid into the chamber 66 past the restriction.

Figure 11:
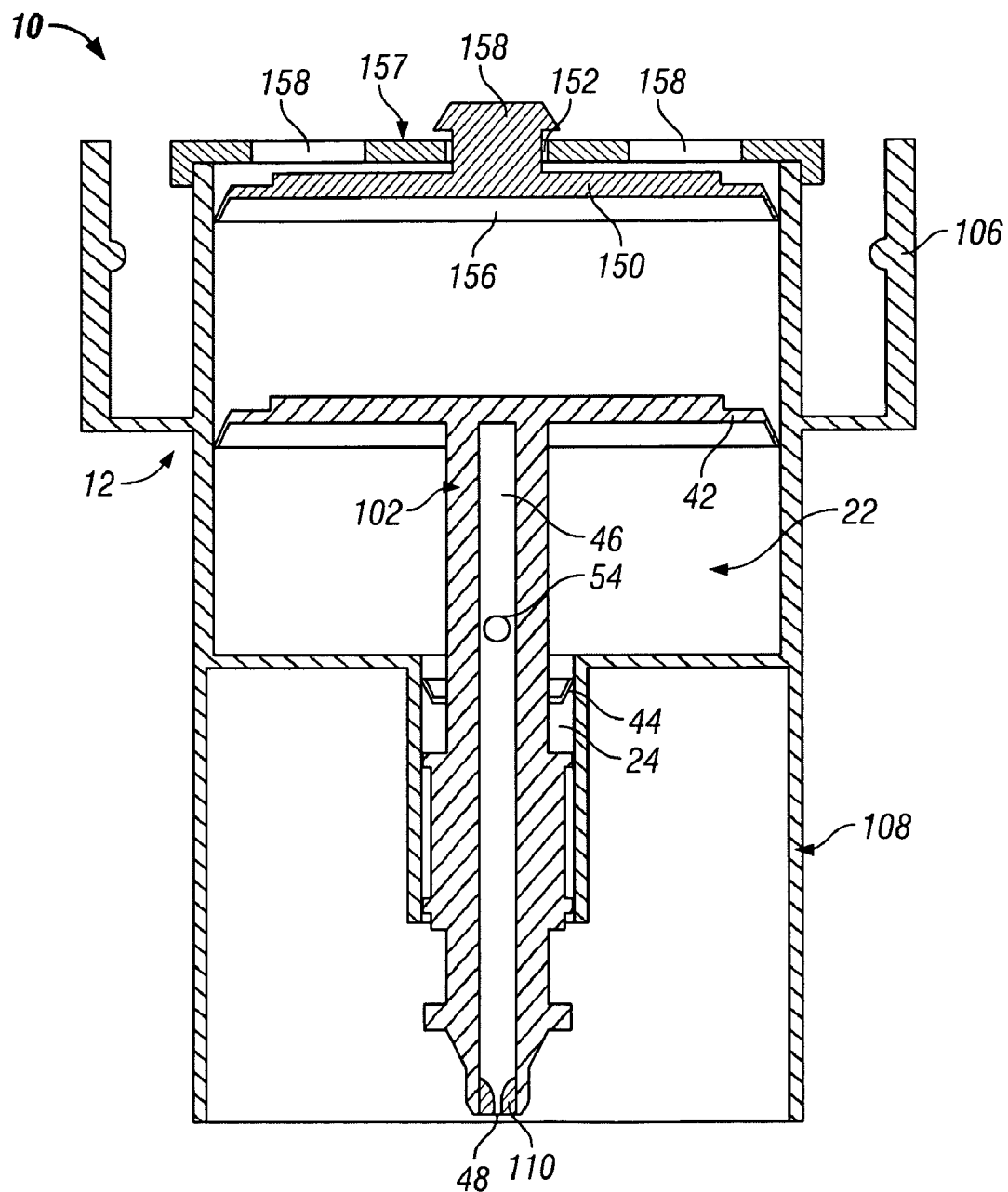
FIG. 11 is a cross-sectional side view of a pump assembly in accordance with a sixth embodiment of the present invention showing the piston in a fully retracted position.

Reference is made to FIG. 11 which illustrates a sixth embodiment of a piston pump assembly 10 with close similarities to the pump assembly shown in FIG. 5. FIG. 5 illustrates a first liquid pump comprising a stepped cylinder pump which discharges fluid into a withdrawal stroke. FIG. 11 shows a modification of the arrangement in FIG. 5 to replace the stepped cylinder liquid pump by the elimination of the inner disc 40 with a one-way valve 150 provided in an inlet port 152 to the chamber 22. The valve 150 has a stem 154 which carries an inner valve disc 156 which extends radially outwardly from the stem 154 to engage the side wall of the chamber 22. The valve disc 156 has a resilient outer perimeter which is directed outwardly and engages the wall of the chamber 22 to prevent fluid flow therepast inwardly yet deflects radially inwardly to prevent fluid flow outwardly therepast. Similar such one-way valves could be used in replacement of the inner disc 40 in the embodiment of FIGS. 5, 8 and 9 where the liquid pump and air pump are in phase. As shown, a cap member 157 closes the inner end of the chamber 22 and has a central port 152 to receive the stem 154 of the valve 150 and, as well, openings 158 therethrough to provide communication between the reservoir and the chamber 22.

Figure 12:
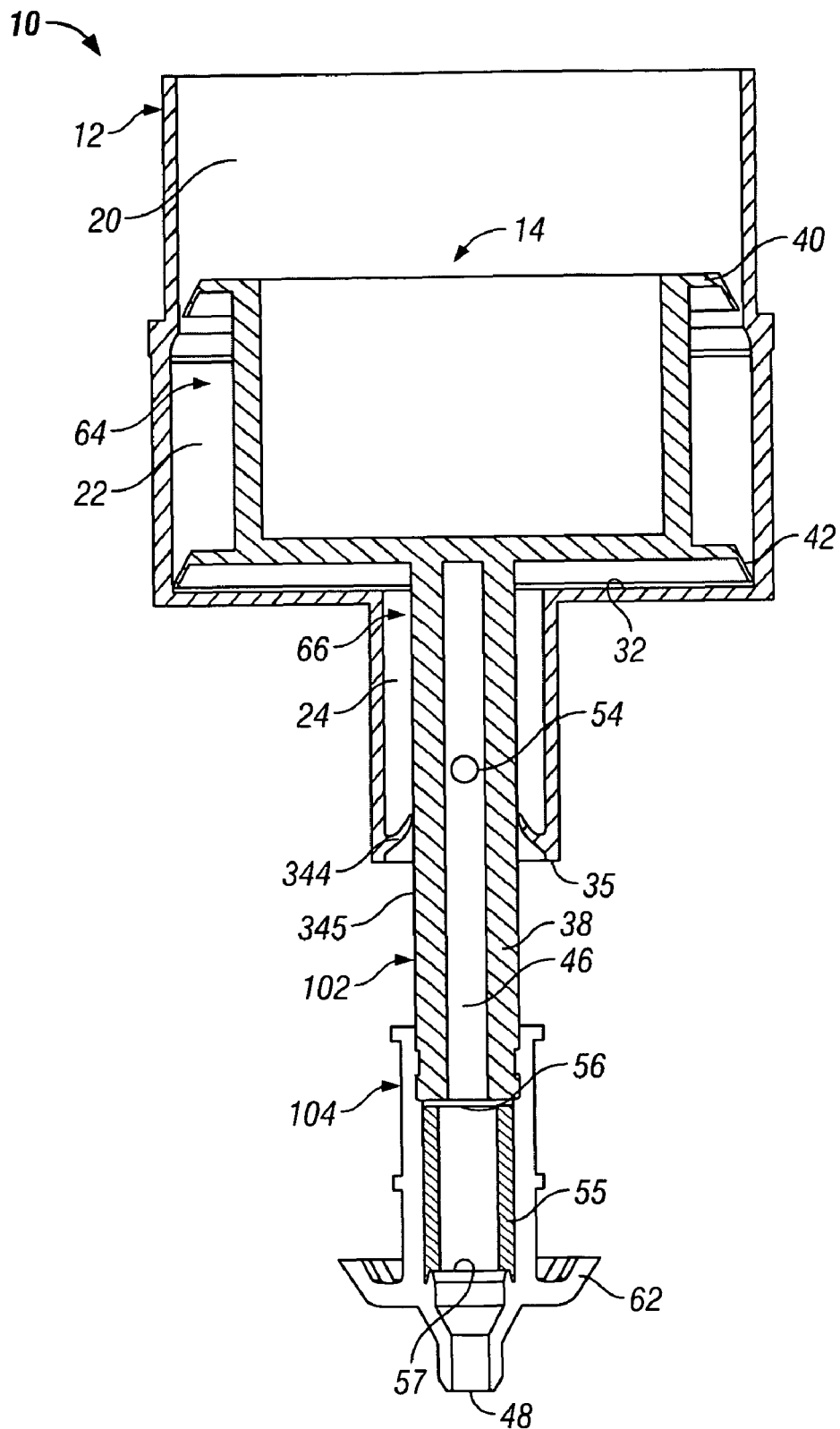
FIG. 12 is a cross-sectional side view of a pump assembly in accordance with a seventh embodiment of the present invention showing the piston in a fully withdrawn position.

Reference is made to FIG. 12 but illustrates a seventh embodiment of a piston pump assembly in accordance with the present invention in a withdrawn position identical to the first embodiment shown in FIG. 4 with the first exception that the outer disc 44 in FIG. 4 has been removed and replaced by an outer disc 344 which is carried on the body 12 and extends from the chamber wall 36 of the outer chamber 24 inwardly to engage a cylindrical radially outwardly directed surface 345 of the stem 38 so as to prevent flow of air and fluid outwardly past the outer disc 344. The other exception is that in FIG. 12, the stem 38 has been increased in axial length so as to provide adequate axial length for the outer disc 344 to engage the cylindrical wall 345 throughout a complete cycle of a stroke.

FIG. 12 shows one embodiment in which one of the discs, namely, the outer disc 44 provided on the piston 14 in FIG. 3, is replaced by a complementary disc provided on the body 12 such as the disc 344. Other discs shown in the various embodiments may similarly be replaced from being on the piston 14 to being on the body 12.

Figure 13:
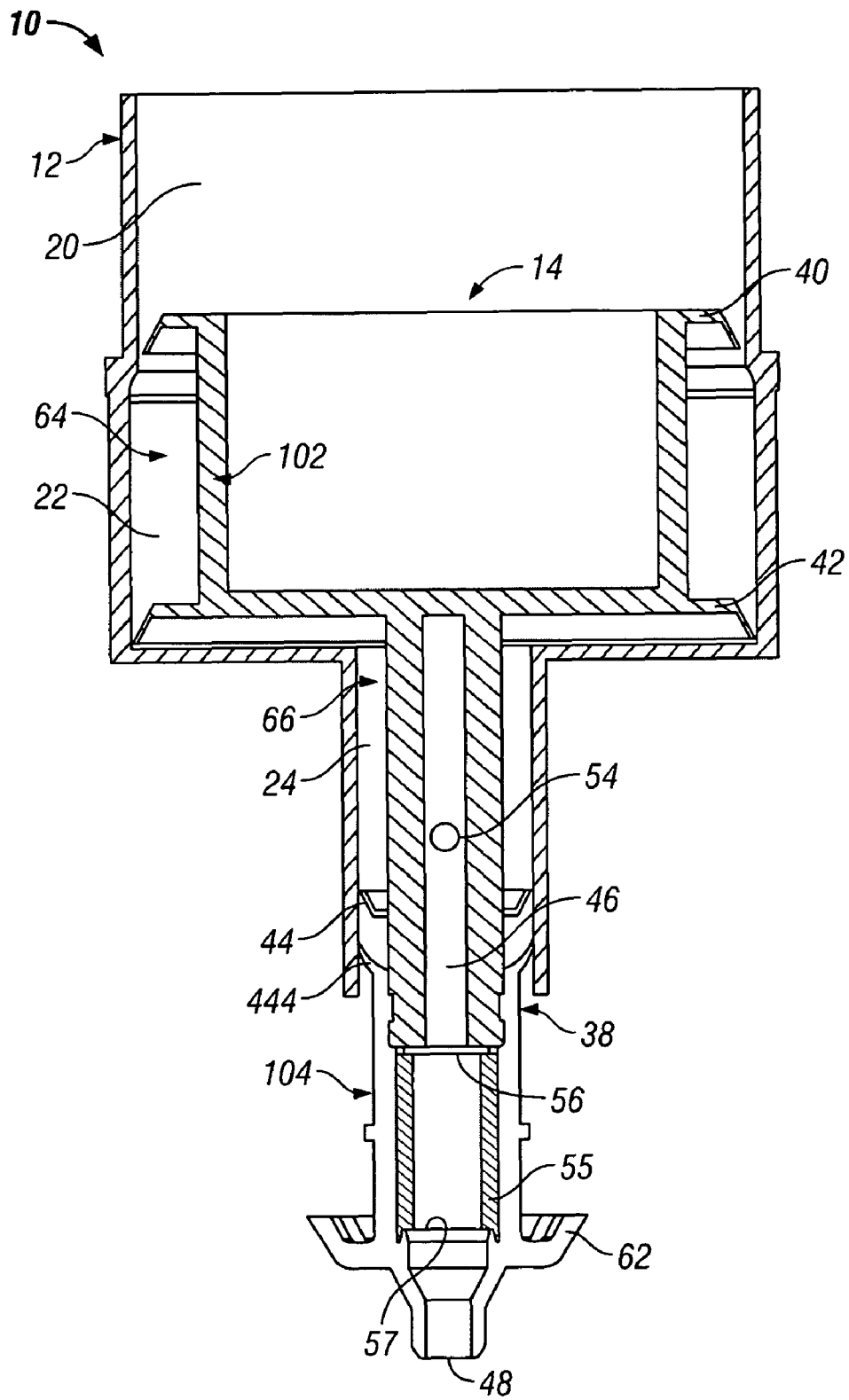
FIG. 13 is a cross-sectional side view of a pump assembly in accordance with an eight embodiment of the present invention showing the piston in a fully retracted position.

Reference is made to FIG. 13 which illustrates an eighth embodiment of a pump assembly 10 in accordance with the present invention in a withdrawn position which is identical to the first embodiment of FIG. 4 with the first exception that a second sealing disc 444 is provided on the stem 38. Providing two sealing discs, namely the outer sealing disc 44 and the sealing disc 444 better assists in ensuring that there will not be leakage of liquid from the outer chamber 24 outwardly. In FIG. 13, the sealing disc 44 is providing on the inner piston element 102 and the sealing disc 444 is provided on the outer piston element 104 towards assisting in manufacture. It is to be appreciated that both of the sealing flanges could be provided on the inner piston element 102 or on the outer piston element 104. Additionally, in combination with a sealing disc such as 44 or 444 provided on the piston 14, a sealing disc such as 344 may be provided on the body 12 as shown in FIG. 12.

Figure 14:
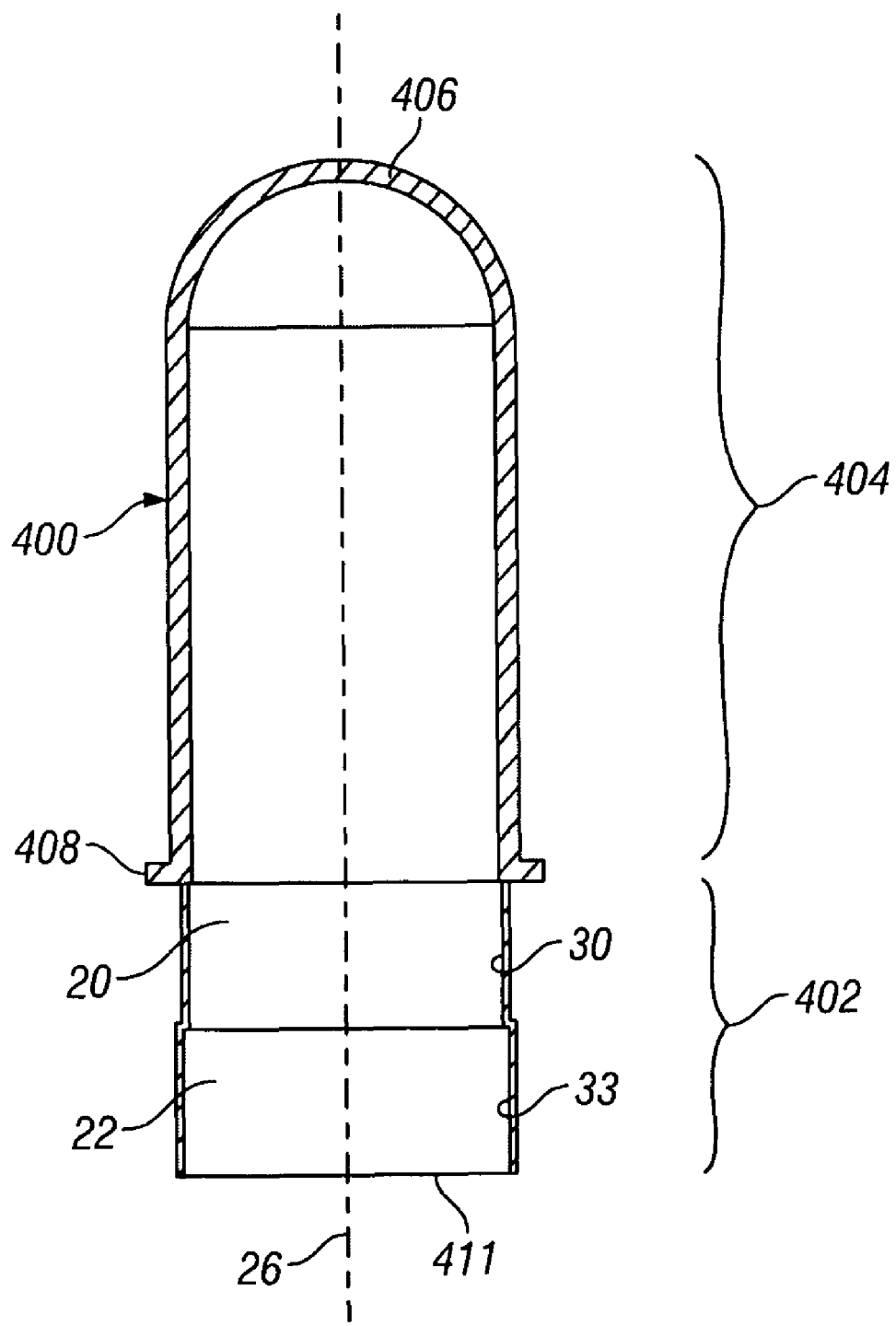
FIG. 14 is a cross-sectional side view of a pre-form for a bottle in accordance with a ninth embodiment of the present invention.

Reference is made to FIG. 14 which shows a bottle preform 400 manufactured from plastic by an injection moulding process and including a neck portion 402 and a tube portion 404. Each of the neck portion 402 and the tube portion 404 are circular in cross-section about a central axis 26. The tube portion 404 is closed at an inner end 406. The neck portion 402 includes a radially outwardly extending holding flange 408. Outwardly from the holding flange 408 there are provided two stepped cylinders with an inner cylinder 20 formed by an inner cylinder wall 30 and an intermediate cylinder 22 formed by an outer cylindrical wall 33. As shown, the diameter of the inner chamber 20 is less than the diameter of the intermediate chamber 22.

Figure 15:
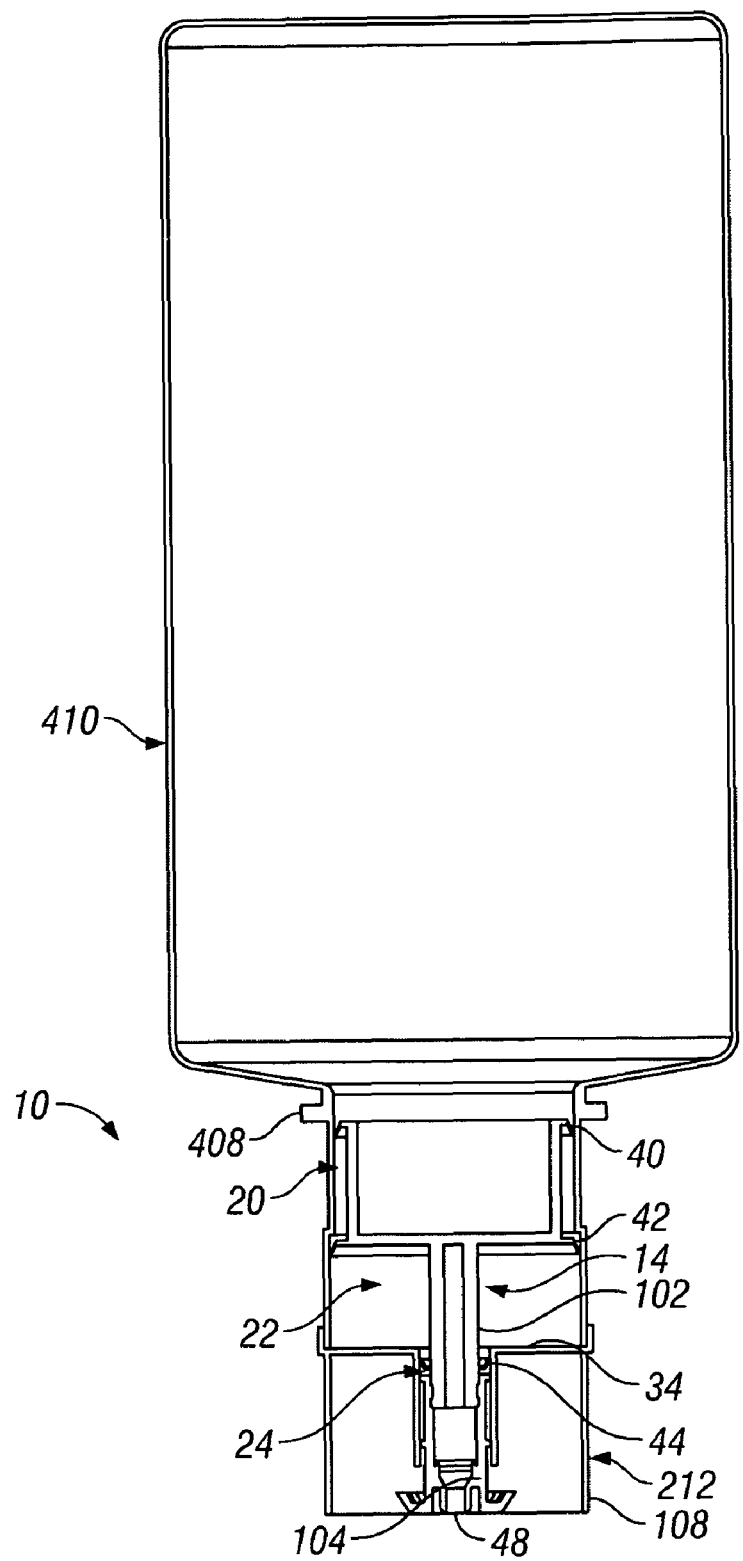
FIG. 15 is a cross-sectional side view of a tenth embodiment of a pump assembly in accordance with the present invention including a bottle made from the pre-form shown in FIG. 14.

Reference is made to FIG. 15 which illustrates a bottle 410 which has been formed from the pre-form 400 of FIG. 14 in a stretch blow moulding process typically involving heating of the pre-form as to above the glass transition temperature, then applying high pressure air inside the pre-form to stretch the tube portion 404 of FIG. 14 to provide bottle interior walls having a desired configuration as shown in FIG. 15 inwardly from the holding flange 408. In such stretch blow moulding process, the neck portion 402 of the pre-mould 400 of FIG. 14 is not altered.

As seen in FIG. 15, to the open end 411 of the chamber 22, a body end member 212 is secured which body end member 212 carries a shoulder 34 closing the outer end of the chamber 22 which opens into the outer chamber 24. The end body portion 212 also includes a protective shroud 108 similar to that shown in FIG. 5. FIG. 15 shows a pump assembly 10 substantially identical to the pump assembly of the first embodiment shown in FIGS. 1 to 4 with the addition of the protective shroud 108 and with the equivalent of the piston chamber-forming body 12 in the first embodiment of FIGS. 2 to 4 being formed with the inner chamber 20 and intermediate chamber 22 provided by the neck portion 402 of the pre-form and the outer chamber 24 provided by the end body portion 212. In accordance with an embodiment alternate to that shown in FIG. 15, the neck portion 402 may provide merely the inner chamber 20 and the end body portion 212 could provide, in addition to what is shown in FIG. 15, also the intermediate chamber 22. In the embodiment illustrated in FIGS. 14 and 15, the fact that the inner chamber 20 has a smaller diameter than the outer chamber 22 facilitates removal of the internal mould core from the pre-form 400 on injection moulding. Insofar as a pre-form such as shown in FIGS. 14 and 15 may be desired to construct a pump such as shown in FIG. 5 with the inner chamber 20 to be of a larger diameter than the intermediate chamber 22, then it would be preferred that the neck portion 402 merely include the inner chamber 20 and both the intermediate chamber 22 and the outer chamber 24 be provided on the body end portion 212.

While this invention has been described with reference to preferred embodiments, the invention is not so limited. Many modifications and variations will now occur to persons skilled in the art. For a definition of the invention, reference is made to the appended claims.

I claim:

1. A pump for dispensing liquid from a reservoir comprising:

a piston chamber-forming member having an inner cylindrical chamber, an intermediate cylindrical chamber and an outer cylindrical chamber, the inner chamber, intermediate chamber and outer chamber each having a diameter, a chamber wall, an inner end and an outer end, the diameter of the inner chamber being less than the diameter of the intermediate chamber, the diameter of the outer chamber being less than the diameter of the intermediate chamber, the inner chamber, intermediate chamber and outer chamber being coaxial with the outer end of the inner chamber opening into the inner end of the intermediate chamber, and the outer end of the intermediate chamber opening into the inner end of the outer chamber, the inner end of the inner chamber in fluid communication with the reservoir, a piston-forming element received in the piston chamber-forming member axially slidable inwardly and outwardly therein between an inward retracted position and an outward extended position, said piston-forming element having a central axially extending hollow stem having a central passageway closed at an inner end and having an outlet proximate an outer end, an inner disc extending radially outwardly from the stem, the inner disc adapted to engage the chamber wall of the inner chamber, an intermediate disc extending radially outwardly from the stem spaced axially outwardly from the inner disc, the intermediate disc adapted to engage the chamber wall of the intermediate chamber, an outer disc extending radially outwardly from the stem spaced axially outwardly from the intermediate disc, the outer disc engaging the chamber wall of the outer chamber, an inlet located on the stem between the intermediate disc and the outer disc in communication with the passageway, the piston-forming element slidably received in the piston chamber-forming member for reciprocal axial inward and outward movement therein with the inner disc in the inner chamber, the intermediate disc in the intermediate chamber and the outer disc in the outer chamber, the inner disc substantially preventing fluid flow in the inner chamber past the inner disc in an inward direction, the intermediate disc substantially preventing fluid flow in the intermediate chamber past the intermediate disc in an inward direction, the outer disc substantially preventing fluid flow in the outer chamber past the outer disc in an outward direction, the inner disc elastically deformable away from the chamber wall of the inner chamber to permit fluid flow in the inner chamber past the inner disc in an outward direction, the intermediate disc elastically deformable away from the chamber wall of the intermediate chamber to permit fluid flow in the intermediate chamber past the intermediate disc in an outward direction.

2. A pump as claimed in claim 1 wherein in the piston-forming element moving from the retracted position to the extended position, liquid from the reservoir is displaced in an outward direction past the inner disc to between the inner disc and the intermediate disc, and both liquid and air are displaced from between the intermediate disc and the outer disc through the inlet and passageway, and out the outlet; and in the piston-forming element moving from the extended position to the retracted position, liquid is displaced in an outward direction past the intermediate disc to between the intermediate disc and the outer disc, and air is drawn into between the intermediate disc and the outer disc.

3. A pump as claimed in claim 2 wherein in the piston-forming element moving from the extended position to the retracted position, the air drawn into between the intermediate disc and the outer disc comprises atmospheric air drawn inwardly via the outlet through the passageway.

4. A pump as claimed in claim 3 wherein in the piston-forming element moving from the extended position to the retracted position, the air drawn into between the intermediate disc and the outer disc further comprises air in the passageway drawn inwardly.

5. A pump as claimed in claim 3 wherein in the piston-forming element moving from the extended position to the retracted position, air and fluid in the passageway drawn inwardly into between the intermediate disc and the outer disc.

6. A pump as claimed in claim 1 wherein the air drawn into between the intermediate disc and the outer disc is drawn thereinto, at least in part, via the outlet, passageway and inlet.

7. A pump as claimed in claim 1 wherein the outer disc engaging the chamber wall of the outer chamber circumferentially thereabout to form a substantially fluid impermeable seal therewith on sliding of said piston-forming element inwardly and outwardly between the retracted and the extended positions, and all the atmospheric air drawn into between the intermediate disc and the outer disc is drawn thereinto via the outlet, passageway and inlet.

8. A pump as claimed in claim 1 wherein the outer disc having an elastically deformable edge portion proximate the chamber wall of the outer chamber circumferentially thereabout, the outer disc elastically deformable away from the chamber wall of the outer chamber to permit air flow in the outer chamber past the outer disc in an inward direction, the air drawn into between the intermediate disc and the outer disc is drawn thereinto at least in part inwardly in the outer chamber past the outer disc.

9. A pump as claimed in claim 1 wherein the air drawn into between the intermediate disc and the outer disc is drawn thereinto at least in part via the outlet, passageway and inlet.

10. A pump as claimed in claim 1 including an orifice member in the passageway between the inlet and the outlet selected from a porous member for generating turbulence in fluid passing therethrough to generate foam when liquid and air pass therethrough simultaneously and a nozzle member to at least partially atomize liquid when liquid and air pass therethrough simultaneously.

11. A pump as claimed in claim 1 wherein:

the inner end of the intermediate chamber comprises an annular shoulder opening into the outer end of the inner chamber, and the outer end of the intermediate chamber comprises an annular shoulder opening into the inner end of the outer chamber.

12. A pump as claimed in claim 1 in which each of the piston chamber-forming member and piston-forming member element is of generally circular cross-section disposed coaxially about a central axis along which the piston-forming element and piston chamber-forming member are slidable relative each other.

13. A pump as claimed in claim 1 in which the inner chamber is above the intermediate chamber, the intermediate chamber is above the outer chamber, the inner end of the inner chamber is above the outer end of the inner chamber, the inner end of the intermediate chamber is above the outer end of the intermediate chamber, and the inner end of the outer chamber above the outer end of the outer chamber.

14. A pump as claimed in claim 13 in which the reservoir is above the inner chamber.

15. A pump as claimed in claim 1 wherein the diameter of the outer chamber is less than the diameter of the inner chamber.

16. A pump for producing and dispensing foam, comprising:

an air compartment having an inlet and an outlet, a fluid compartment having a fluid inlet and a fluid outlet, the fluid inlet being in flow communication with a liquid containing reservoir, a foam generating member for generating turbulence in air and liquid passing therethrough to produce foam, the foam generating member positioned downstream from the air compartment outlet and the fluid outlet to receive liquid which has been discharged through the fluid outlet and air which has been discharged through the air compartment outlet, a discharge outlet downstream from the foam generating member open to the atmosphere for discharge of any air, liquid and foam discharged outwardly through the foam generating member, the pump comprising a first member and a second member cooperating to define the air compartment and the fluid compartment, the second member being reciprocally slidable with respect to the first member between an extended position and a retracted position, whereby moving the second member in a withdrawal stroke from the retracted position to the extended position pressurizes the air compartment thereby forcing liquid and air through the foam generating member and simultaneously drawing liquid from the reservoir through the fluid inlet into the fluid compartment, and whereby moving the second member in a retraction stroke from the extended position to the retracted position pressurizes the fluid compartment thereby discharging liquid from the fluid compartment out the fluid outlet and simultaneously draws air into the air compartment.

17. A pump as claimed in claim 16 wherein:

the first member comprises a piston chamber-forming member having an inner end, an intermediate cylindrical chamber and an outer cylindrical chamber, intermediate chamber and outer chamber each having a diameter, a chamber wall, an inner end and an outer end, the diameter of the outer chamber being less than the diameter of the intermediate chamber, intermediate chamber and outer chamber being coaxial with the outer end of the intermediate chamber opening into the inner end of the outer chamber, the inner end of the piston chamber-forming member in fluid communication with the reservoir, the second member comprises a piston forming element received in the piston chamber-forming member axially slidable inwardly and outwardly therein between an inward retracted position and an outward extended position, said piston forming element having a central axially extending hollow stem having a central passageway closed at an inner end and having an outlet proximate an outer end, an intermediate disc extending radially outwardly from the stem, the intermediate disc adapted to engage the chamber wall of the intermediate chamber, an outer disc extending radially outwardly from the stem spaced axially outwardly from the intermediate disc, the outer disc engaging the chamber wall of the outer chamber, a stem inlet located on the stem between the intermediate disc and the outer disc in communication with the passageway, the piston forming element slidably received in the piston chamber-forming member for reciprocal axial inward and outward movement therein with the intermediate disc in the intermediate chamber and the outer disc in the outer chamber, the intermediate disc substantially preventing fluid flow in the intermediate chamber past the intermediate disc in an inward direction, the outer disc substantially preventing fluid flow in the outer chamber past the outer disc in an outward direction, the intermediate disc elastically deformable away from the chamber wall of the intermediate chamber to permit fluid flow in the intermediate chamber past the intermediate disc in an outward direction, the piston chamber-forming member and piston-forming element forming a liquid pump mechanism therebetween including a one-way valve inwardly of the intermediate chamber and the intermediate disc, the liquid pump mechanism receiving liquid from the reservoir and displacing liquid in an outward direction through the inner end past the one-way valve to between the one-way valve and the intermediate disc, wherein in the piston-forming element moving from the retracted position to the extended position, liquid from the reservoir is displaced in an outward direction through the inner end by the liquid pump past the one-way valve to between the one-way valve and the intermediate disc, and both liquid and air are displaced from between the intermediate disc and the outer disc through the stem inlet and passageway and out the outlet and in the piston-forming element moving from the extended position to the retracted position, liquid is displaced by the liquid pump in an outward direction past the intermediate disc to between the intermediate disc and the outer disc, and air is drawn into between the intermediate disc and the outer disc, the intermediate chamber is above the outer chamber, the inner end of the piston chamber-forming member is above the inner end of the intermediate chamber, the inner end of the intermediate chamber is above the outer end of the intermediate chamber, and the inner end of the outer chamber above the outer end of the outer chamber.

18. A pump as claimed in claim 16 wherein in the piston-forming element moving from the extended position to the retracted position, the air drawn into between the intermediate disc and the outer disc comprises atmospheric air drawn inwardly via the outlet through the passageway.

19. A pump for dispensing liquid and air, comprising:

an air compartment having an inlet and an outlet, a fluid compartment having a fluid inlet and a fluid outlet, the fluid inlet being in flow communication with a liquid containing reservoir, an outlet passageway downstream from the air compartment outlet and the fluid outlet to receive liquid which has been discharged through the fluid outlet and air which has been discharged through the air compartment outlet, the outlet passageway communicating with a discharge outlet open to the atmosphere for discharge of air and liquid, the pump comprising a first member and a second member cooperating to define the air compartment and the fluid compartment, the second member being reciprocally slidable with respect to the first member between an extended position and a retracted position, whereby moving the second member in a withdrawal stroke from the retracted position to the extended position pressurizes the air compartment thereby forcing liquid and air through the outlet passageway and simultaneously drawing liquid from the reservoir through the fluid inlet into the fluid compartment, and whereby moving the second member in a retraction stroke from the extended position to the retracted position pressurizes the fluid compartment thereby discharging liquid from the fluid compartment out the fluid outlet and simultaneously draws air into the air compartment.

20. A pump as claimed in claim 19 wherein:

the first member comprises a piston chamber-forming member having an inner end, an intermediate cylindrical chamber and an outer cylindrical chamber, intermediate chamber and outer chamber each having a diameter, a chamber wall, an inner end and an outer end, the diameter of the outer chamber being less than the diameter of the intermediate chamber, intermediate chamber and outer chamber being coaxial with the outer end of the intermediate chamber opening into the inner end of the outer chamber, the inner end of the piston chamber-forming member in fluid communication with the reservoir, the second member comprises a piston forming element received in the piston chamber-forming member axially slidable inwardly and outwardly therein between an inward retracted position and an outward extended position, said piston-forming element having a central axially extending hollow stem having a central passageway closed at an inner end and having an outlet proximate an outer end, an intermediate disc extending radially outwardly from the stem, the intermediate disc adapted to engage the chamber wall of the intermediate chamber, an outer disc extending radially outwardly from the stem spaced axially outwardly from the intermediate disc, the outer disc engaging the chamber wall of the outer chamber, a stem inlet located on the stern between the intermediate disc and the outer disc in communication with the passageway, the piston-forming element slidably received in the piston chamber-forming member for reciprocal axial inward and outward movement therein with the intermediate disc in the intermediate chamber and the outer disc in the outer chamber, the intermediate disc substantially preventing fluid flow in the intermediate chamber past the intermediate disc in an inward direction, the outer disc substantially preventing fluid flow in the outer chamber past the outer disc in an outward direction, the intermediate disc elastically deformable away from the chamber wall of the intermediate chamber to permit fluid flow in the intermediate chamber past the intermediate disc in an outward direction, the piston chamber-forming member and piston-forming element forming a liquid pump mechanism therebetween including a one-way valve inwardly of the intermediate chamber and the intermediate disc, the liquid pump mechanism receiving liquid from the reservoir and displacing liquid in an outward direction through the inner end past the one-way valve to between the one-way valve and the intermediate disc, wherein in the piston-forming element moving from the retracted position to the extended position, liquid from the reservoir is displaced in an outward direction through the inner end by the liquid pump past the one-way valve to between the one-way valve and the intermediate disc, and both liquid and air are displaced from between the intermediate disc and the outer disc through the stem inlet and passageway and out the discharge outlet and in the piston-forming element moving from the extended position to the retracted position, liquid is displaced by the liquid pump in an outward direction past the intermediate disc to between the intermediate disc and the outer disc, and air is drawn into between the intermediate disc and the outer disc, the intermediate chamber is above the outer chamber, the inner end of the piston chamber-forming member is above the inner end of the intermediate chamber, the inner end of the intermediate chamber is above the outer end of the intermediate chamber, and the inner end of the outer chamber above the outer end of the outer chamber.

* * * * *